US012505471B2

(12) United States Patent
Xu et al.

(10) Patent No.: US 12,505,471 B2
(45) Date of Patent: Dec. 23, 2025

(54) ADVERTISEMENT EXPOSURE MANAGEMENT

(71) Applicant: Comcast Cable Communications, LLC, Philadelphia, PA (US)

(72) Inventors: Kan Xu, Beijing (CN); Wenyuan Zhang, Beijing (CN); Xue Zhang, Beijing (CN); Qiang Wang, Beijing (CN); Yun Su, Beijing (CN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/124,968

(22) Filed: Mar. 22, 2023

(65) Prior Publication Data
US 2024/0211999 A1 Jun. 27, 2024

Related U.S. Application Data

(63) Continuation of application No. PCT/CN2022/141997, filed on Dec. 26, 2022.

(51) Int. Cl.
*G06Q 30/00* (2023.01)
*G06Q 30/0251* (2023.01)
*G06Q 30/0272* (2023.01)
*G05B 19/418* (2006.01)

(52) U.S. Cl.
CPC ..... *G06Q 30/0272* (2013.01); *G06Q 30/0254* (2013.01)

(58) Field of Classification Search
CPC .............. G06Q 30/0272; G06Q 30/0254
See application file for complete search history.

(56) References Cited

U.S. PATENT DOCUMENTS

| 7,806,329 | B2 | 10/2010 | Dmitriev et al. |
| 2002/0178447 | A1 | 11/2002 | Plotnick et al. |
| 2010/0287026 | A1 | 11/2010 | Smith |
| 2012/0239507 | A1 | 9/2012 | Braginsky |
| 2015/0058133 | A1 | 2/2015 | Roth et al. |
| 2021/0321151 | A1* | 10/2021 | Haberman ......... H04N 21/2668 |
| 2022/0329888 | A1* | 10/2022 | Fairchild ............ G06Q 30/0275 |

FOREIGN PATENT DOCUMENTS

| CN | 109740060 A | 5/2019 |
| CN | 110097402 A | 8/2019 |

OTHER PUBLICATIONS

"Incentive design for ad-sponsored content: Results from a randomized trial". IEEE. 2017. (Year: 2017).*
"Personalized dynamic ad insertion with MPEG DASH". IEEE. 2016. (Year: 2016).*
Sep. 1, 2023—International Search Report—PCT/CN2022/141997.

* cited by examiner

*Primary Examiner* — Maria V Vanderhorst
(74) *Attorney, Agent, or Firm* — Banner & Witcoff, Ltd.

(57) ABSTRACT

Systems, apparatuses, and methods are described for adjusted exposure threshold values. Each user may be associated with one or more of a plurality of exposure threshold values, for example, a frequency cap value, that may be a cap (e.g., threshold) on the number of times a repeat advertisement content may be output to a user. Exposure threshold values may be modified based on one or more viewing statistics, for example, information about one or more interactions of the user associated with one or more outputs of repeat advertisement content, environment information, and/or one or more advertisement characteristics.

22 Claims, 11 Drawing Sheets

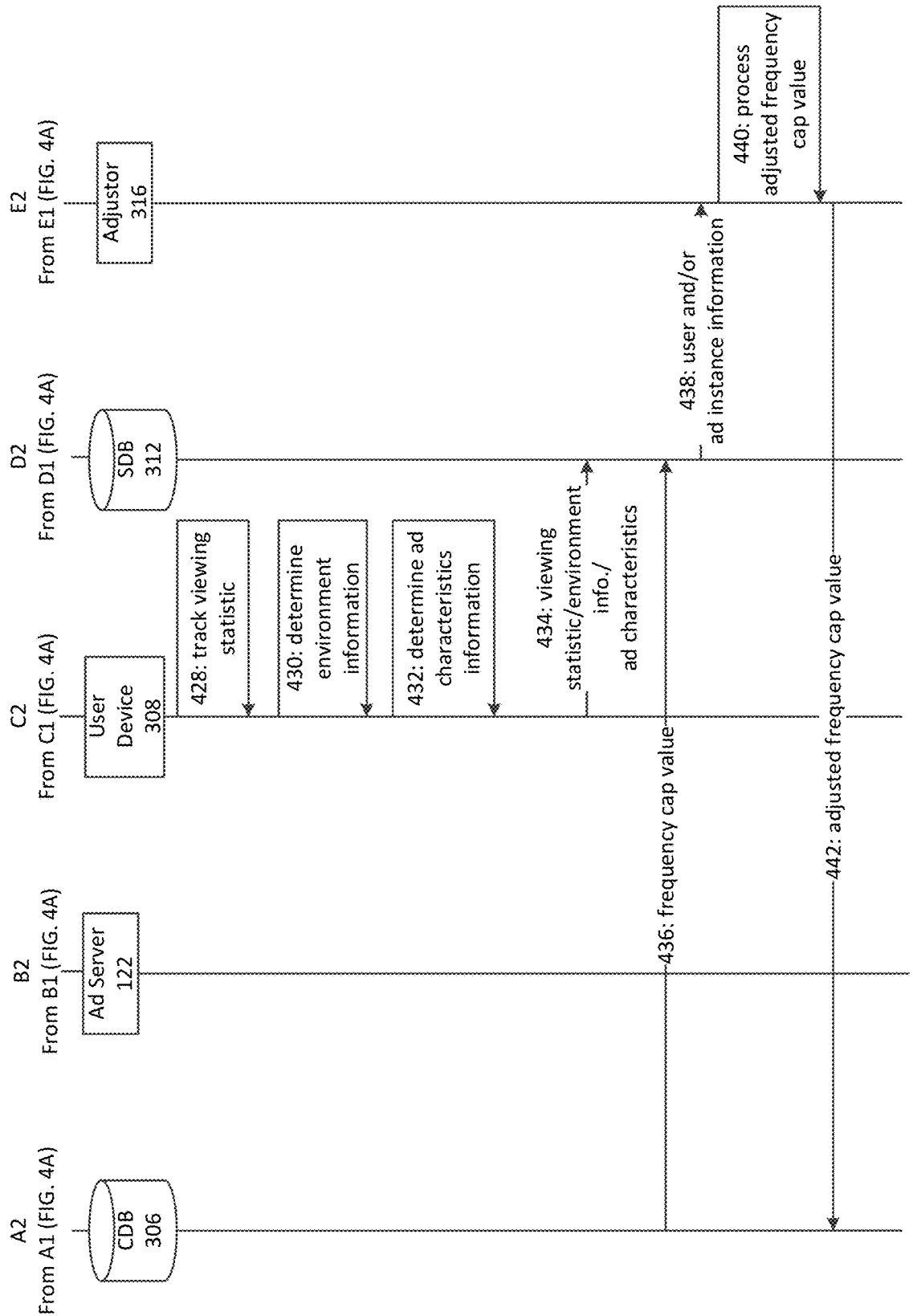

User 1

Base Advertisement User Exposure Threshold Values
- Adjusted Frequency Cap = 4
- Ad Content to time of content watched Ratio = 2:4
- ...

Environment Modifiers
- After 9:00pm = 1.2
- While Eating Dinner = 0.5
- While Watching Sports = 1.1
- On Den Device = 1.05
- ...

Advertisement Characteristics Modifiers
- Political = 0.75
- Car = 1.25
- Cool Color Scheme = 1.1
- ...

Final value = baseline (env mod)(characteristics mod) OR
Final value = Baseline + env mod + characteristics mod

User 2

Base Advertisement User Exposure Threshold Values
- Adjusted Frequency Cap = 3
- Time of Ad Content Played to Time Ratio = 1:4
- ...

Environment Modifiers
- After 9:00pm = 0.25
- While Eating Dinner = -2
- While Watching Anime = +2
- On Den Device = +0.1
- ...

Advertisement Characteristics Modifiers
- Political = +2
- Car = +0.5
- Cool Color Scheme = +0.2
- ...

Final value = baseline (env mod)(characteristics mod) OR
Final value = Baseline + env mod + characteristics mod

User 3

Environment Specific Adjusted Freq. Caps
- After 9:00pm = 6.25
- While in Gym = 5
- While Watching Adventure Content = 6.55
- On Den Device = 4
- ...

Advertisement Characteristics Specific Adjusted Freq. Caps
- Political = 1
- Car = 5.5
- Cool Color Scheme = 6.5
- ...

Environment and Ad Characteristics Specific Combination Adjusted Freq. Cap
- Political While Eating Dinner = 1
- Car While Watching Sports on Den Device = 5.5
- Upbeat Ad Music While Exercising = 15
- ...

FIG. 6

ADVERTISEMENT EXPOSURE MANAGEMENT

CROSS-REFERENCE TO RELATED APPLICATIONS

This application is a continuation of and claims priority to PCT/CN22/141997, filed Dec. 26, 2022, which is hereby incorporated by reference in its entirety.

BACKGROUND

Secondary content (e.g., advertising) is often delivered in conjunction with primary content (e.g., entertainment content, news content, sports content, etc.). Effective delivery of secondary content may depend on many parameters. One such parameter is exposure threshold, which relates to how many times a user may view or otherwise consume the same advertisement without losing interest and/or being motivated to select alternate content.

SUMMARY

The following summary presents a simplified summary of certain features. The summary is not an extensive overview and is not intended to identify key or critical elements.

Systems, apparatuses, and methods are described for determining adjusted advertisement exposure threshold values and/or for acting based on such threshold values. Users of computing devices for outputting content may have exposure thresholds for repeat advertisement content, and those exposure thresholds may vary by user. Individual exposure thresholds may be determined for each user by tracking one or more viewing statistics each time (e.g., instance) an advertisement content is output to the user. The tracked viewing statistic may indicate the amount and/or portion of the advertisement content instance that is output to the user without being avoided (e.g., by changing a channel) by the user. A user's exposure threshold may be affected by the environment of the user when viewing an advertisement. For example, a user may have a higher exposure threshold for repeat advertisement content after 9:00 pm as compared to when the user is eating dinner. Different exposure threshold values may be determined for each user based on different user environments. A user's exposure threshold may also be affected by the characteristics of an advertisement content. For example, a user may have a higher exposure threshold for programming advertisements as compared to political advertisements. Different exposure threshold values may be determined for each user based on different advertisement content characteristics. Improved accuracy exposure threshold values may be determined for each user based on one or more of the tracked viewing statistics, environment information, and/or advertisement characteristics. Learned, adjusted, or modified exposure threshold values may facilitate improve advertisement effectiveness, and help to reduce or avoid loss of viewership of primary content associated with advertisements, by improving selection and/or communication of advertisements to avoid exceeding users' advertisement exposure thresholds.

These and other features and advantages are described in greater detail below.

BRIEF DESCRIPTION OF THE DRAWINGS

Some features are shown by way of example, and not by limitation, in the accompanying drawings In the drawings, like numerals reference similar elements.

FIGS. 4A and 4B are a diagram showing communications and/or steps in one or more example methods associated with adjusted advertisement exposure values.
FIG. 6 shows example partial user exposure threshold value profiles for multiple users.

DETAILED DESCRIPTION

Figure 1:
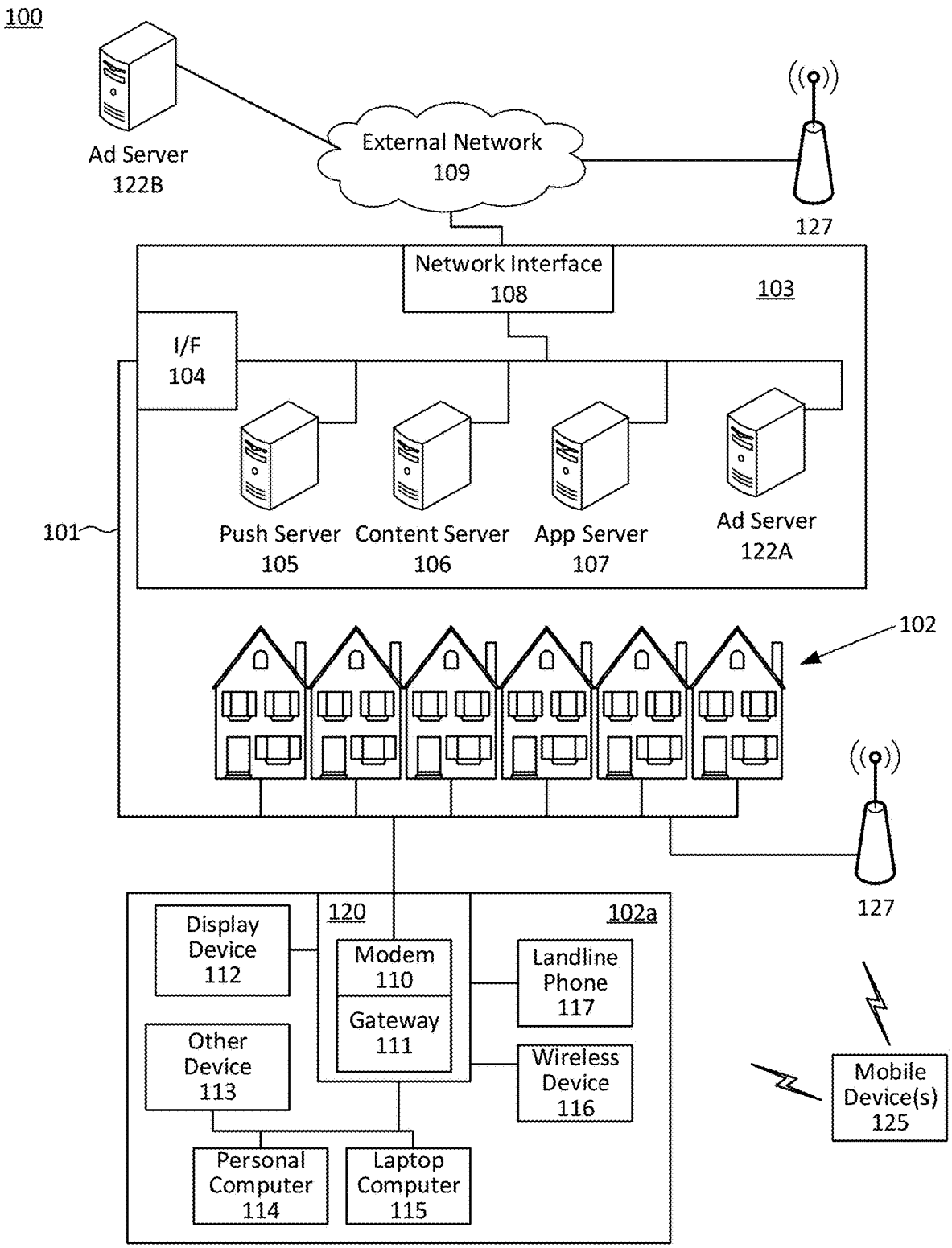
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

Interest in and/or willingness to view a particular advertisement may tend to decrease as that advertisement is repeatedly output to users of devices for outputting content (e.g., primary content combined with advertisements). This tendency may be considered when selecting an advertisement for output to a user. If a selected advertisement is one which that user has already viewed, an advertising opportunity (e.g., an advertisement slot in a primary content item) may be wasted. For example, the user may ignore the advertisement because the user has recently viewed it. In some cases, the user may become frustrated with and/or annoyed by repeated presentation of the same advertisement and may decide to view different primary content, or may cease viewing altogether. Conversely, if a selected advertisement is not one that the user has recently viewed, the user may be less inclined to turn away or lose interest.

An exposure threshold may comprise a value that represents a quantity of times that a user is likely to view a particular advertisement without losing interest or turning away. This exposure threshold may be used to increase the effectiveness of providing advertisements to that user. As part of selecting an advertisement for output during an advertising opportunity, a quantity of previous presentations of each of one or more advertisements may be compared to the exposure threshold of that user. If that quantity exceeds that threshold for a particular advertisement, that advertisement may be rejected and another advertisement may be selected. However, exposure thresholds vary by user, and those thresholds may not be accurately predicted based solely on demographics or other criteria often used for identifying groups of users to whom advertisements may be presented. Moreover, exposure thresholds may be affected by factors such as environment in which an advertisement is viewed and/or the content of an advertisement.

To better determine exposure thresholds for users, actions by individual users may be tracked and used to determine exposure thresholds for those individual users. For example, and as described in more detail herein, one or more viewing statistics may be tracked for each output of a repeated advertisement. A repeated advertisement may comprise an advertisement that is output to a user more than one time. Advertisement viewing statistics may comprise information indicating one or more interactions of the user associated with each output of the repeated advertisement. The user's exposure threshold may be determined and/or modified based on the one or more viewing statistics. In this way, improved exposure threshold values may be determined for each user.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122A, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The external network 109 may further comprise one or more external network advertisement servers 122B (multiple examples of advertisement servers 122 are described herein e.g., local office advertisement server 122A and external network advertisement server 122B, and may be referred to generally herein as advertisement server 122). The external network advertisement server 122B may be in communication with one or more devices at the local office 103 (e.g., app server 107 and/or content server 106) and/or one or more devices at premises 102 (e.g., modem 110 and/or gateway 111). The external network advertisement server 122B may be a third-party advertisement server (e.g., operated by an entity different from an entity operating the local office) or may be operated by the same (or a subsidiary of) the entity that operates the local office. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the advertisement (ad) server 122A (described below), additional push, content, and/or application servers, and/or other types of servers. Also or alternatively, one or more of the push server 105, the content server 106, and/or the application server 107 may be part of the external network 109 and may be configured to communicate (e.g., via the local office 103) with computing devices located in or otherwise associated with one or more premises 102. Although shown separately, the push server 105, the content server 106, the application server 107, the advertisement server 122A, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
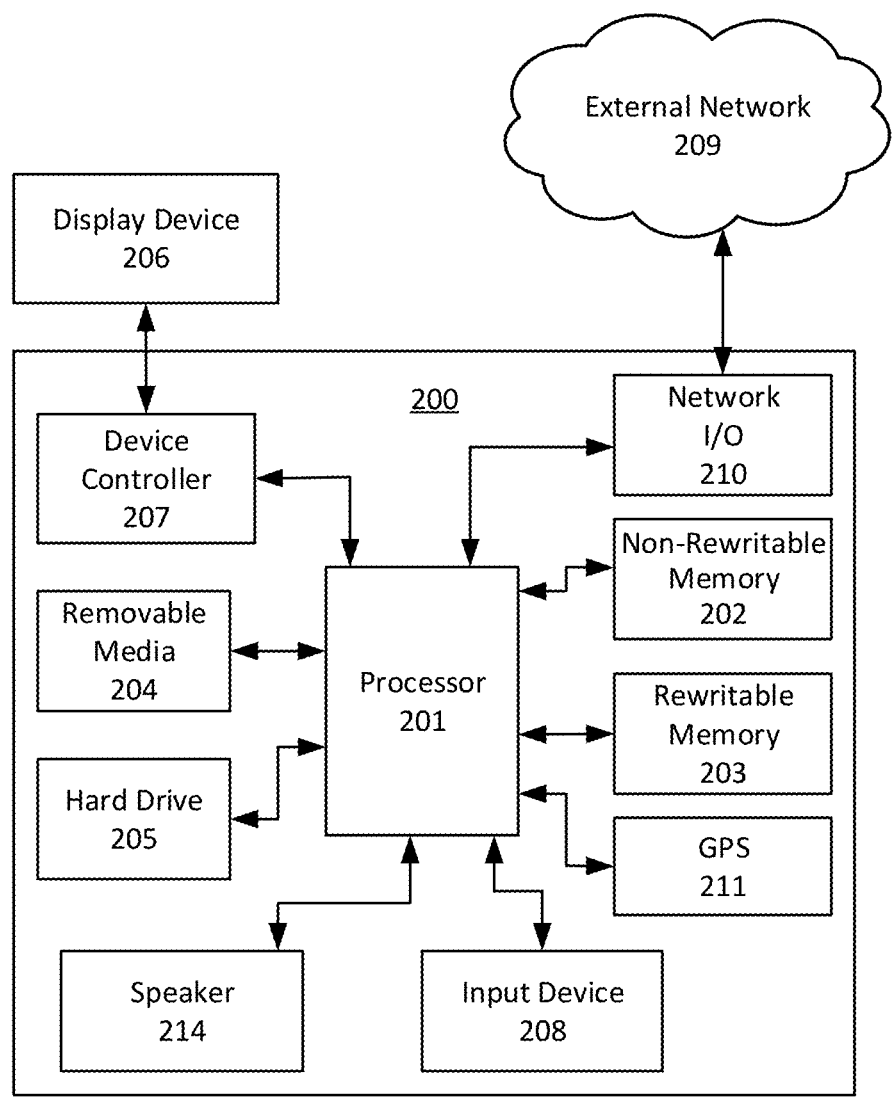
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., advertisement (ad) server 122A, advertisement (ad) server 122B, configuration database 306, user device 308, statistics database 312, adjustor 316). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Secondary content (e.g., advertisement content) may be served to be consumed by users. Users may be users of the computing devices of communication network 100, for example, a user of a computing device at a premises 102. Users may consume (e.g., watch, listen to, view) assets (e.g., content (e.g., primary content and secondary content)) that may be output via a user device, for example, one or more of the computing devices at premises 102a of FIG. 1. Such output may be facilitated by a content player and/or other applications executing on the output device. Advertisement content (e.g., secondary content) may be variously served or otherwise presented to users while consuming primary content. Each user may have one or more thresholds for exposure to advertisement content (e.g., to repeat advertisement content). For example, a user may have a reduced exposure threshold for repeat instances of a repeat advertisement content after a certain number of exposures to the repeat advertisement content. Accordingly, a user may be less inclined to view an instance of a repeat advertisement, or more inclined to avoid (e.g., skip, change program) an instance of a repeat advertisement, if output of the instance of the repeat advertisement would cause the user's exposure threshold value to be exceeded. An instance of an advertisement content may comprise a single playing and/or output of an advertisement content by a content player. A repeat advertisement may comprise a single advertisement content that may be output multiple times (e.g., repeated) to a user and/or via one or more devices associated with a user. Each output of a repeat advertisement (e.g., an initial output and each subsequent output of a repeat advertisement) may comprise an instance of the repeat advertisement. Providers (e.g., content providers, advertisement publishers) may place an advertisement frequency cap for the number of exposures of each user to a particular advertisement content. Providers may use advertisement exposure thresholds to set a frequency caps for users. Improving accuracy of frequency caps may assist in decision making to improve users' experiences and/or to make advertisement selection and/or output decisions.

Advertisement exposure threshold values and/or frequency cap values may be predicted for and/or assigned to each user, or groups of users, based on a best-guess of a provider. Providers may group users by demographics (e.g., age, gender, interests, etc.) and assign a single predicted value to the group of users. Additionally or alternatively, a providers may simply apply a single frequency cap value to all members of an audience. However, that frequency cap value may be stagnant and may be applied to all or many different advertisement servers, and may have little or no relationship with an actual advertisement exposure threshold of any given user. Described herein are systems, methods, and apparatuses for determining an adjusted advertisement exposure threshold that may be more accurate than, and/or that may otherwise improve over, exposure thresholds determined using best guesses and/or demographics, and may be used to determine improved advertisement frequency cap values for content consumers (e.g., users).

Figure 3:
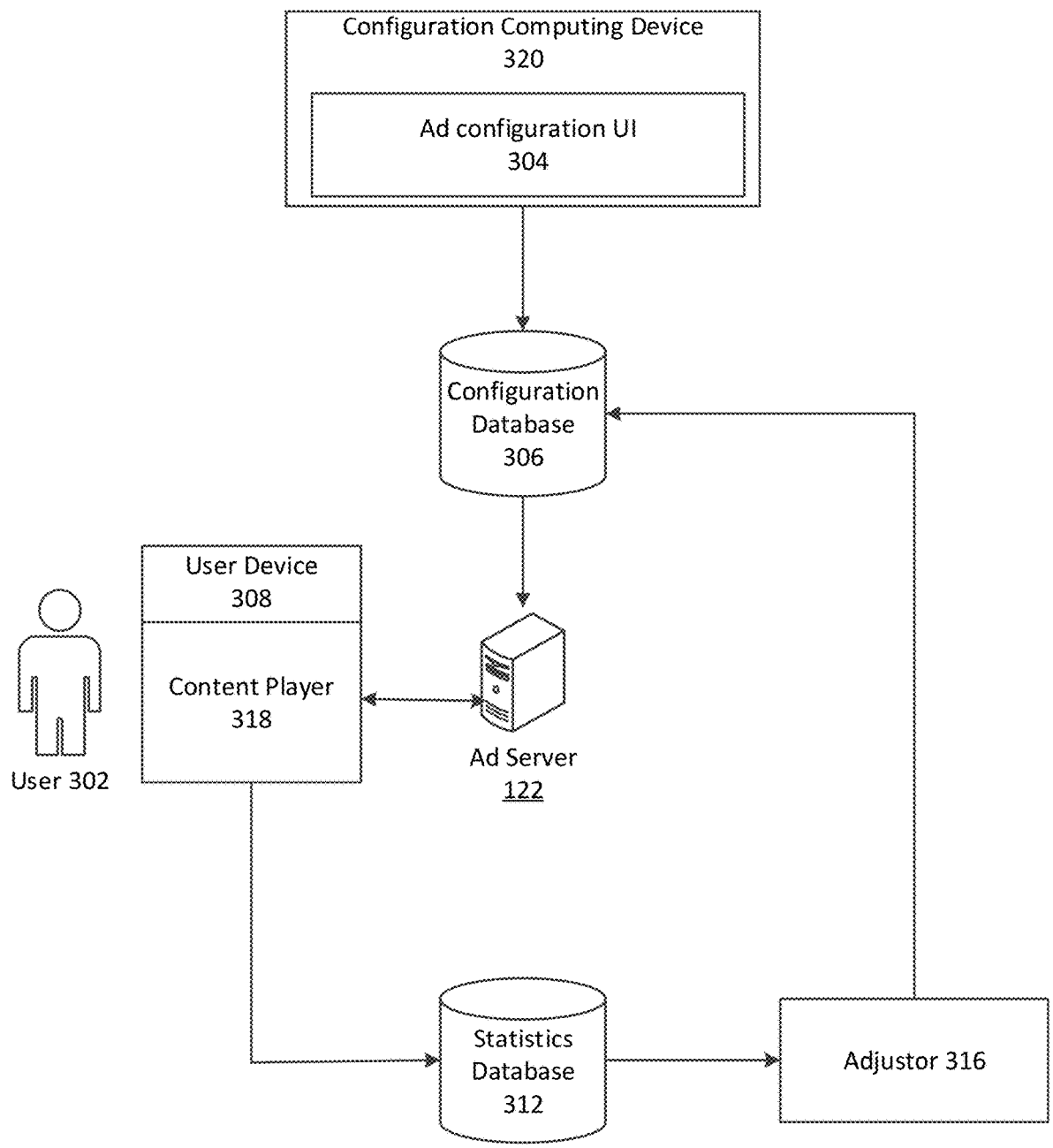
FIG. 3 shows an example environment 300 in which adjusted advertisement exposure threshold values may be determined.

FIG. 3 shows an example environment 300 in which adjusted advertisement exposure threshold values may be determined. The example environment 300 may be associated with a user 302. The user 302 may be, for example, a user at one of premises 102. The user 302 may consume (e.g., view and/or listen to) content. The environment 300 may further comprise a configuration computing device 320. The configuration computing device 320 may output an advertisement configuration user interface (UI) 304. The configuration UI 304 may provide a UI for assigning (e.g., by a system administrator) a predicted user advertisement exposure threshold value (e.g., a predicted advertisement frequency cap value). The configuration UI 304 may allow for further configuration of user advertisement exposure threshold values and user profiles. The environment 300 may further comprise configuration database 306. The configuration database 306 may store user advertisement exposure threshold values and may map the user advertisement exposure threshold values to one or more particular user devices (e.g., user device 308, devices 112-117, and/or 125 of FIG. 1), particular users (e.g., user 302), and/or particular premises (e.g., one of premises 102). The configuration database 306 may additionally or alternatively store and/or process one or more user profiles as described herein. The configuration database 306 may be at one or more of various locations. For example, the configuration database 306 may be at the local office 103. Additionally or alternatively, the configuration database 306 may be in the external network 109. Additionally or alternatively, the configuration database 306 may not be in a single location but may be distributed.

For example, the configuration database 306 may be distributed between each premises 102. One or more devices at premises 102 may store a portion of the configuration database 306. For example, each gateway 111 may store and/or process advertisement exposure threshold data and/or user profile data for one or more users at each of premises 102.

The user 302 may consume primary content output via one or more user devices 308. The user device 308 may, for example, comprise one or more of devices 111-117 and/or mobile device 125 of FIG. 1. The user device 308 may comprise a content player 318, for example, a content player software and/or application, to output content based on user content data (e.g., video data and/or audio data). Primary content may comprise for example, programming, streaming content, over the air content, or any other content that the user 302 may navigate to, select and/or consume. Primary content may be streamed to the user device 308 and/or content player 318 from one or more servers at the local office 103, for example, the content server 103. Primary content may be interrupted for insertion of advertisement content in advertisement breaks. For example, the user device 308 and/or the content player 318 may receive (e.g., in an MPEG, MPEG-DASH, and/or an HLS stream) a cueing signal (e.g., message) for conveying when and/or how an advertisement break may occur in the primary content. An example of such a signal may comprise a Society of Cable Telecommunications Engineers (SCTE) 35 signal. The content player 318 and/or user device 308 may, in response to the cueing signal and/or based on the cueing signal, generate a request for an advertisement. An example of such a request may be a Video Ad Serving Template (VAST) request which may, amongst other information, transfer information about an advertisement break. The content player 318 and/or user device 308 may send the advertisement request to the advertisement server 122. The advertisement server 122 may store advertisement content and/or serve advertisement content to the user device 308 (and/or other devices e.g., content server 106) and/or may make decisions about advertisements to be served based on the request. Advertisement server 122 may be, for example, at local office 103. Additionally or alternatively, an advertisement server may be located outside of local office 103 and may be in communication with the external network 109 (e.g., advertisement server 122B). In response to the request, the advertisement server 122 may generate an advertisement response (e.g., a VAST response). The advertisement response may comprise information about the advertisement to be served. The advertisement response may be in the form of the advertisement content itself (e.g., an MP4 file and/or other content files). Additionally or alternatively, the advertisement response may indicate an address (e.g., a URL) from which the advertisement content may be retrieved.

Advertisement content may be requested from the advertisement server 122 for output via the user device 308. For example, the user device 308 and/or the content player 318 may be in communication with the gateway 111. The user device 308, the content player 318, and/or the gateway 111 may send a request for an advertisement content to the advertisement server 122. The request may be in response to a cueing signal accompanying primary content (e.g., an SCTE 35 signal) for the insertion of one or more advertisement contents. The advertisement server 122 may process the request as described herein. The advertisement server 122 may determine an advertisement content, and/or the advertisement server 122 may determine whether to serve the advertisement content to the user device 308 and/or content player 318 (e.g., via gateway 111).

The user device 308 and/or content player 318 may receive the advertisement content, for example, with the response (e.g., VAST response) or based on information in the response (e.g., based on an address (e.g., URL) in the response). The advertisement content may be in the form of a content file (e.g., an MP4 file). The user device 308 and/or the content player 318 may insert and/or output the advertisement content at the advertisement break in the primary content (e.g., programming) based on the cueing message.

Additionally or alternatively, one or more devices at the local office 103 may send a request for advertisement content (e.g., an advertisement request) to the advertisement server 122. For example, the content server 106 may detect a cueing signal in a content delivery. In response, one or more devices at the local office (e.g., the content server 106) may generate an advertisement request (e.g., a VAST request). The device at the local office 103 may send that advertisement request to the advertisement server 122. The advertisement server 122 may, in response, generate an advertisement response (e.g., a VAST response) that may comprise the advertisement content and/or information on where/how to retrieve the advertisement content. Following receipt of the advertisement content, one or more devices at the local office 103 (e.g., the application server 107 and/or content server 106) may incorporate (e.g., stitch) the advertisement into the content delivery stream (e.g., into the stream of content delivery). Additionally or alternatively, the local office 103 may request an advertisement in real time and forward the advertisement content to the user device 308 to be played by the user device 308 instead of the primary content.

One or more advertisement viewing statistics for the user 302 may be tracked by one or more devices. For example, the user device 308 and/or content player 318 may track and/or record one or more viewing statistics. A viewing statistic may comprise information about an interaction of the user 302 with an output of an instance of an advertisement content (e.g., a repeat advertisement content). The viewing statistic may comprise, for example, a view through rate (VTR). The VTR may comprise a percentage of all advertisement contents output to the user 302 in a period of time that output to completion. The viewing statistic may, additionally or alternatively, comprise other statistics (e.g., the percentage output to completion of each impression or instance of an advertisement content).

The environment 300 may further comprise a statistics database 312 to collect the one or more viewing statistics. The statistics database 312 and the configuration database 306 may be implemented using the same computing device or different computing devices. Like the configuration database 306, the statistics database 312 may be located at one or more locations (e.g., the local office 103, in the external network 109, and/or distributed between devices on premises 102).

In addition to one or more viewing statistics, environment information may be determined (e.g., tracked, received, and/or recorded). Environment information (e.g., one or more environment parameters) may comprise information associated with the environment of the user 302 during a repeat advertisement output (e.g., instance of an advertisement content). Example environment information may comprise a time of day during the repeat advertisement output, the activity (e.g., eating dinner, at the gym, etc.) of the user 302 during the repeat advertisement output, the primary content that was interrupted for the repeat advertisement output, the device via which the repeat advertisement was output, etc. Environment information may be determined by one or more devices. For example, the environment information may be determined by the user device 308 via which the repeat advertisement was output. Additionally or alternatively, environment information may be determined by a second user device (e.g., a user device that is different from the user device 308 via which the repeat advertisement impression is output), for example a mobile device, a wearable mobile device, gateway 111, etc. Additionally or alternatively, environment information may be determined by the advertisement server 122. Additionally or alternatively, environment information may be determined by the statistics database 312. Additionally or alternatively, environment information may be determined by one or more devices and/or servers at the local office 103.

In addition to the viewing statistics and environment information, one or more advertisement content characteristics may be determined for each advertisement content. Advertisement content characteristics may comprise, for example, a genre of advertisement content (e.g., political advertisement content, car advertisement content, etc.), a theme of advertisement content, a color scheme of the advertisement content, an average decibel level of the advertisement content, and/or other advertisement content characteristics. Like the environment information, the advertisement content characteristics may be determined by one or more devices. For example, the advertisement server 122, the user device 308, and/or one or more devices and/or servers at the local office 103 may be used to determine one or more advertisement content characteristics. Additionally or alternatively, the advertisement creator and/or uploader (e.g., the entity that uploads the advertisement to the advertisement server 122) may identify one or more advertisement content characteristics for the uploaded advertisement content. The advertisement creator and/or uploader may include the one or more identified advertisement content characteristics in, for example, metadata associated with the advertisement content.

The environment 300 may further comprise an adjustor 316. The adjustor 316 may modify a present frequency cap value (e.g., the predicted frequency cap, a modified frequency cap, an adjusted frequency cap) for the user 302 based on one or more viewing statistics, environment information, and/or one or more advertisement content characteristics. The adjustor 316 may send the adjusted and/or modified (e.g., learned) frequency cap value to the configuration database 306 and/or the advertisement server 122. The advertisement server 122 may process subsequent advertisement requests for the user 302 using the modified frequency cap value for the user 302. The adjustor 316 may be a part of the same device as, and/or at the same location as, the statistics database 312. Alternatively, the adjustor 316 may be a part of a separate device from the statistics database 312. The adjustor 316 may be distributed as described with respect to configuration database 306 above.

A single entity may provide content to the user 302 via multiple different devices, in multiple different formats, and/or using multiple different content accessing applications. For example, the user 302 may consume content output via display device 112. Such content may, for example, comprise linear programming and/or over-the-top programming (e.g., over-the-top television). The user 302 may consume additional or alternative content that is output via mobile device 125 (for example via one or more content accessing applications executing on mobile device 125). A single adjusted frequency cap may be determined and applied for the user 302 across multiple devices, formats, and/or content accessing applications. Alternatively, different adjusted frequency caps may be applied for a single user for different devices, formats, and/or content accessing applications.

Figure 4A:
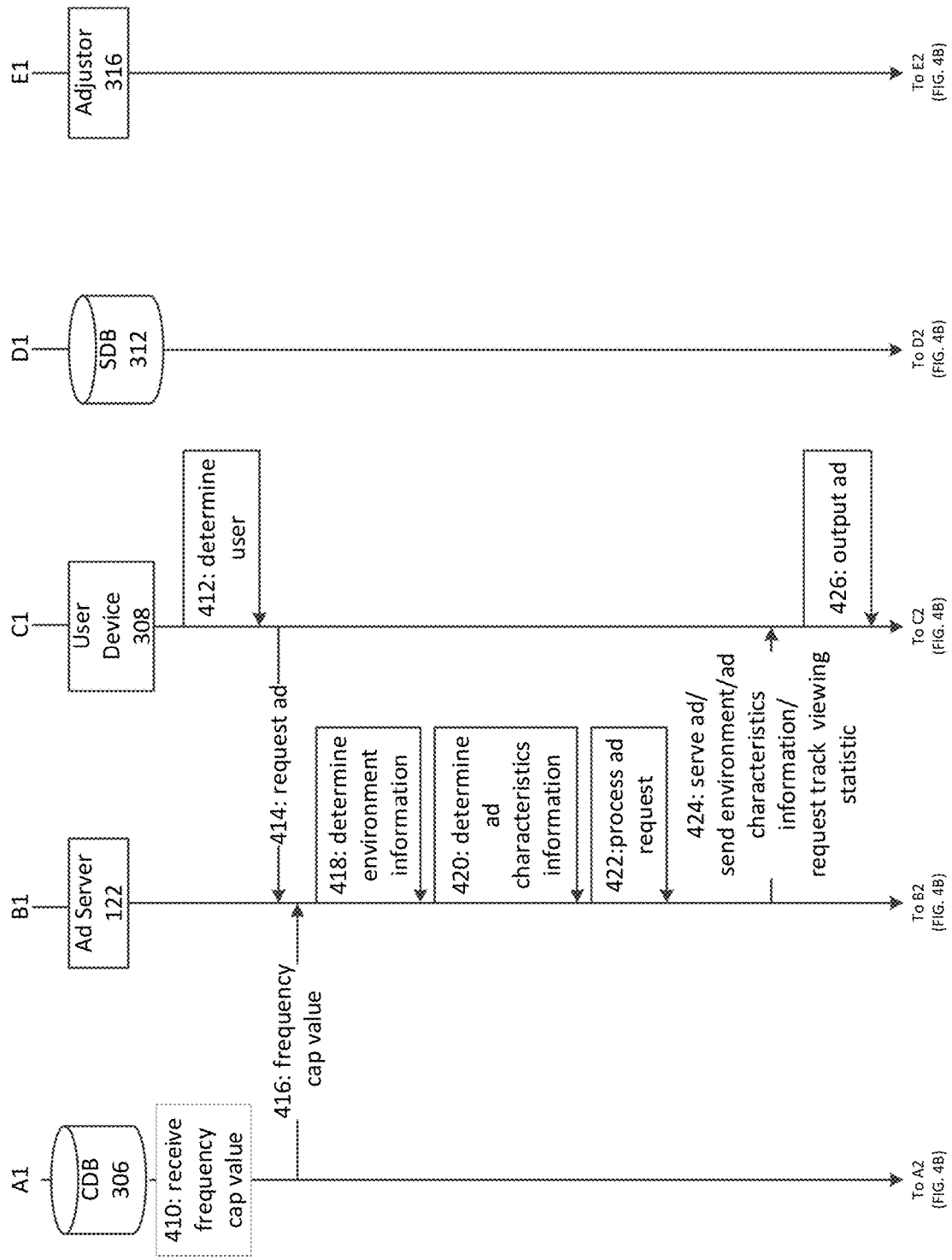

FIGS. 4A and 4B are a diagram showing communications and/or steps in one or more example methods associated with adjusted advertisement exposure values. FIG. 4B is a continuation of FIG. 4A, as indicated at the bottom of FIG. 4A and at the top of FIG. 4B. Although FIGS. 4A and 4B show certain computing devices from FIG. 1 and FIG. 3 as examples of computing devices that may perform one or more of the steps described below, one, some, or all of those steps may be performed by one or more other computing devices. The devices shown in FIGS. 4A and 4B (and/or other computing devices) may be configured (e.g., based on stored instructions) to perform steps such as are described herein. One or more of the communications and/or steps shown in FIGS. 4A and 4B may be rearranged, omitted and/or otherwise modified, and/or other steps and/or communications added. A communication shown in, and/or described in connection with, FIGS. 4A and 4B need not be a single message nor contained in a single packet, block, or other transmission unit.

The configuration database 306 (indicated as "CDB" in FIGS. 4A and 4B) may comprise a database of frequency cap values mapped to individual users (e.g., individual users consuming content output via user device 308 and/or content player 318) (e.g., user 302). As described above, the configuration database 306 may receive frequency cap values via a configuration UI (e.g., configuration UI 304) and/or from the adjustor 316. Although one or more steps of FIGS. 4A-4B are described with example to the user device 308, operations described for the user device 308 could additionally or alternatively be carried out using other computing devices and/or other types of computing devices (e.g., the content server 106 and/or any other device or server at the local office 103). Additionally, operations and/or steps described as being performed by the user device 308 may additionally or alternatively be performed by software (e.g., the content player 318 and/or other software) executing on the user device 308.

At step 410, the configuration database 306 may receive a frequency cap value for the user 302. The received frequency cap value may be a predicted and/or assigned frequency cap value. Such a predicted and/or assigned frequency cap value may be input to, and/or received from, a configuration computing device (e.g., configuration computing device 320). Alternatively, the received frequency cap value may be an adjusted and/or modified (e.g., learned) frequency cap value as described herein. Such an adjusted frequency cap value may be a modified frequency cap value. The adjusted frequency cap value may be received from, for example, the adjustor 316.

At step 412 the user device 308 may determine (e.g., by recognizing, by receiving information identifying, by identifying) the user 302 consuming content being output via the user device 308. For example, a database may comprise a mapping of user devices to users. Such a database may be located, for example, at the local office 103, or may be distributed amongst user devices (e.g., gateways 111). The user device 308 may be one of one or more personal computing devices of an individual user (e.g., user 302). Accordingly, each personal computing device (e.g., user device 308) may have a device identifier (e.g., IP address) and the identifier of the personal computing device may be associated with the user 302. Alternatively, some computing devices may be shared devices (e.g., a display device shared by a number of family members) and the user device 308 may be associated with one or more such shared users. A determination of which user or users is/are using the shared device at a time of a particular output of an instance of a repeat advertisement may be made. The user device 308 may use any number of methods to associate the user 302 with an output of an instance of a repeat advertisement impression and/or advertisement instance. For example, the user device 308, and/or an additional computing device in communication with the user device 308 (e.g., a remote control, a wearable computing device), may use voice recognition to associate a particular user with an output of an instance of a repeat advertisement. Additionally or alternatively, the user device 308 may use user indicators, for example, the genre of programming, time of day, program interactions, etc. along with other indicators, to help predict the particular user during an output of an instance of a repeat advertisement. Additionally or alternatively, one or more personal computing devices (e.g., mobile phone, wearable computing device, etc.) may locate themselves. The additional computing device(s) may report their location(s) in response to a request from the user device 308. The location of such additional computing devices may further assist the determination of the particular user using the user device 308 during the output of an instance of the repeat advertisement. The personal computing devices may locate themselves generally (with respect to coordinates), may locate themselves in relation to the user device 308, and/or may locate themselves in relation to a premises 102 or a location within a premises 102.

At step 414, the user device 308 may send a request for an advertisement content (e.g., an advertisement request). The user device 308 may reach a point in primary content output designated for an advertisement. For example, the user device 308 may receive and/or recognize a cueing signal (e.g., an SCTE 35 signal) associated with the primary content. The user device 308 may generate and/or send a request for an advertisement content (e.g., a VAST request) directly to the advertisement server 122, and the advertisement server 122 may receive the request. Alternatively, the user device 308 may send the advertisement request to one or more intermediate computing devices. Additionally or alternatively, one or more other entities and/or devices may send the advertisement request. For example, one or more devices at the local office 103 (e.g., the content server 106) may detect the cueing signal and send the request for advertisement content.

The advertisement request in step 414 may be in the form of a (VAST) request. The VAST request may be sent to the advertisement server 122. Additionally, the advertisement request in step 414 may comprise additional information. For example, the advertisement request may be accompanied by identification information identifying the user 302 consuming the content being output via the user device 308. Additionally or alternatively, the advertisement request may be accompanied by information identifying the user device 308. Accordingly, the user device 308 and/or the advertisement server 122 may associate the advertisement request with the user 302 and/or the user device 308. Additionally, the request may comprise additional user information, for example one or more user demographics (e.g., gender, interests, age, race, etc.), user preferences, user location, a frequency cap value for the user 302, etc. Each advertisement request may be associated with a particular user (or particular users) and/or user device. The request (e.g., VAST request) may additionally or alternatively comprise information about the advertisement to be served.

At step 416, the advertisement server 122 may determine (e.g., by receiving) a frequency cap value for the user 302. The frequency cap value may be sent to the advertisement server 122 by, for example, the configuration database 306. The configuration database 306 may send the frequency cap value in response to a request for such value from the advertisement server 122. For example, as described above, the advertisement request may be associated with the user 302. Accordingly, the advertisement server 122 may send a request for a frequency cap value of the user 302 to the configuration database 306. The frequency cap value may be associated with the user and/or with one or more devices associated with the user. In response, the configuration database 306 may send a frequency cap value for the user 302. Additionally or alternatively, the advertisement server 122 may receive the frequency cap value as a part of the request. Additionally or alternatively, the advertisement server 122 may retrieve the frequency cap value (e.g., from the configuration database 306) based on information in the request.

At step 418, the advertisement server 122 may determine environment information associated with the advertisement request. For example, the advertisement server 122 may determine a time of day of the advertisement request. Additionally, or alternatively, the advertisement server 122 may determine a primary content, and/or type of primary content being output by the user device 308 during a time period associated with the advertisement request. Although the advertisement server 122 may determine environment information, one or more other devices may additionally or alternatively determine environment information.

At step 420, the advertisement server 122 may determine (e.g., by receiving, by computing, by analyzing, etc.) one or more advertisement characteristics. As described above, advertisement characteristics may comprise one or more characteristics of an advertisement content (e.g., advertisement content genre, advertisement theme, color scheme, average decibel level, etc.). The advertisement server 122 may determine any number of advertisement characteristics. Additionally or alternatively, a system administrator may set one or more advertisement characteristics which the advertisement server 122 may track. Alternatively, advertisement content characteristics categories of relevance may be recognized by, for example, a machine learning algorithm. For example, the advertisement server 122 may compare a plurality of advertisement contents. The advertisement server 122 may determine one or more advertisement characteristics of a plurality of advertisement contents. The advertisement server 122 and/or other devices may track which advertisement characteristics have an effect (e.g., most significant effect) on a user's advertisement exposure threshold.

At step 422, the advertisement server 122 may process the request for advertisement content. The advertisement server 122 may determine one or more relevant advertisements for service in response to the advertisement request. The advertisement server 122 may decide which advertisement to serve based on one or more advertisement serving criteria. Advertisement serving criteria may, for example, comprise: whether an advertisement content is live, location of the user consuming the content, relevance of the advertisement, targeting budgets for the advertisement, revenue goals associated with the advertisement, demographics of the user, audience targeting information, environment information (as described herein), one or more advertisement characteristics (as described herein) and/or other criteria. In addition to the one or more advertisement serving criteria, the advertisement server 122 may also use the frequency cap value of the user 302 to determine which advertisement to serve. The advertisement server 122 may determine whether or not the advertisement to serve is a repeat advertisement. The advertisement server 122 may, additionally or alternatively, determine a number of times the repeat advertisement has been served and/or output to the user 302 and/or to a device associated with the user 302 (e.g., based on user information in the request). For example, the advertisement server 122 may associate each advertisement request with a user 302 and/or with a device associated with the user (e.g., based on information in the request, for example, an identifier of the requesting device), for example, the device from which the request is sent (e.g., the user device 308). Additionally or alternatively, the advertisement server 122 may associate each served advertisement with the user 302 and/or with a device associated with the user 302 (e.g., based on information in the advertisement request), for example, the device to which the advertisement is served. The advertisement server 122 (and/or a computing device in communication with the advertisement server 122) may access a database comprising information associating each request and/or instance of a served advertisement with the user 302 and/or with a device associated with the user 302. Accordingly, the advertisement server 122 may query the database and determine a quantity of times the repeat advertisement has been served to a device associated with the user 302 and/or output to the user 302 and/or to a device associated with the user 302. In such a manner, a quantity of outputs of the repeat advertisement to the user 302 and/or to devices associated with the user 302 may be tracked across multiple devices associated with the user 302. Accordingly, an adjusted frequency cap value may be determined and/or used for each of a plurality of different devices associated with the user 302. Additionally or alternatively, an adjusted frequency cap value may be determined and/or used for all, or a portion, of a plurality of devices associated with the user 302. Additionally or alternatively, adjusted frequency cap values may be determined and/or used for different types of devices associated with the user 302 (e.g., a first adjusted frequency cap value determined and/or used for mobile devices associated with the user 302, and a second adjusted frequency cap value determined and/or used for televisions associated with the user 302). Additionally, the advertisement server 122 may determine whether the frequency cap for the user 302 has been met with respect to the advertisement to serve. If the frequency cap has not been met for the advertisement content, the advertisement server 122 may serve the instance of the advertisement content (e.g., in step 424). If the frequency cap has been met for the advertisement content, the advertisement server 122 may determine another advertisement content to serve based on one or more advertisement serving criteria (e.g., as described above) and the frequency cap value of the user 302.

At step 424, the advertisement server 122 may generate and/or send a response (e.g., a VAST response) to the advertisement request. The response from the advertisement server 122 may comprise service of an advertisement. The response may comprise service of the advertisement by, for example, sending the data for the advertisement content (e.g., a file containing the advertisement content). Additionally or alternatively the advertisement server 122 may serve the advertisement by sending information that may allow and/or cause the user device 308 to retrieve the advertisement content (e.g., the information may comprise a URL from which the advertisement may be retrieved). The advertisement server 122 may serve the advertisement content to various devices. For example, the advertisement server 122 may serve the advertisement content to the user device 308 and/or one or more devices at the local office 103 (e.g., the content server 106). In addition to the information to output the advertisement content, the advertisement server 122 may send to the user device 308 (and/or to the statistics database 312) some or all of the determined environment information and/or some or all of the determined information about advertisement characteristics. The message, packet, and/or transmission of information sent by the advertisement server 122 in step 424 may comprise information that may associate the advertisement request instance with environment information, advertisement characteristics information, the user 302 and/or requesting device.

In its response (e.g. VAST response), in step 424, the advertisement server 122 may send instructions for the user device 308 to output the instance of the repeat advertisement content. Additionally, in its response, the advertisement server 122 may further send instructions for the user device 308 to track one or more viewing statistics. The one or more viewing statistics may comprise information about an interaction of the user with the instance of the repeat advertisement content (e.g., as described in more detail with reference to step 428).

At step 426, the user device 308 may output the instance of the served repeat advertisement content. The user device 308 may output the advertisement content in response to the advertisement service (e.g., the response) from the advertisement server 122. The user device 308 may use the information in the response from the advertisement server 122 to output the advertisement content. In addition, the user device 308 may associate some or all of any other information sent by the advertisement server 122 (e.g., environment information, one or more advertisement characteristics, tracking instructions) with the instance of the advertisement content.

At step 428 (FIG. 4B), the user device 308 may track (e.g., determine and/or record) one or more viewing statistics. The one or more viewing statistics may comprise information about an interaction of the user with the instance of the advertisement content. The viewing statistics may, for example, comprise: whether the user avoided the advertisement content (e.g., skipped, changed selected content while the advertisement content was being output, etc.), the amount of the advertisement content output without being avoided, the percentage of the advertisement content output without being avoided, the time the advertisement content was output without being avoided, whether the advertisement content was entirely consumed (e.g., viewed in its entirety by the user 302), whether the user made a selection in response to the output of the advertisement content, whether the advertisement content output continuously for its entire duration without being avoided, and/or other statistics. Additionally or alternatively, one or more viewing statistics may relate an interaction associated with a single output to one or more interactions with one or more additional outputs of the repeat advertisement content (e.g., VTR). Tracked viewing statistics are further described with respect to FIG. 5.

The user device 308 may determine whether the advertisement is a repeat advertisement, and/or may determine how many times the repeat advertisement has been output to the user 302 and/or the frequency at which the repeat advertisement has been output to the user 302. The determination of whether an advertisement content is a repeat may be, for example, based on the advertisement file. For example, the user device 308 may use video and/or audio comparison to compare the served advertisement content to other served advertisement contents and determine whether the served advertisement is a repeat advertisement. Additional or alternative file characteristics (e.g., duration of content, size of file) may be used to determine whether or not the advertisement content is a repeat. Additionally or alternatively, the determination of whether an advertisement content is a repeat may be based on an advertisement content identifier. For example, the advertisement content may be associated with one or more advertisement content identifiers (e.g., a unique identifying alphanumeric string). The user device 308 may compare the advertisement content identifier with the advertisement content identifier of previously output and/or previously served advertisement contents. Additionally or alternatively, the determination of whether the advertisement content is a repeat may be based on an address (e.g., a URL) from which the advertisement content may be retrieved. For example, the user device 308 may compare the address from which the advertisement content is retrieved to the addresses of previously retrieved advertisement contents to determine whether the advertisement content is a repeat.

At step 430, the user device 308 may determine (e.g., by receiving, by recording, by computing, etc.) environment information. As described above, environment information may be determined and may be associated with an output of an instance of an advertisement content. Environment information may comprise any number of parameters, conditions, and/or settings associated with the user 302 during an output of an instance of an advertisement content. Multiple devices may determine environment information. For example, example environment information may comprise the time of day, the day of the week, the activity of the user 302 during the output of an instance of an advertisement content. The user device 308 may be well suited to record such environment information by simply recording the time the advertisement content is output by the user device 308. However, other devices may be better suited to record another environment information. For example, another example of environment information may comprise the activity of the user 302, for example, whether the user 302 is eating (e.g., dinner). A mobile device of the user 302 (e.g., if the mobile device is different from the user device 308) may gather information (e.g., time of day, whether the user recently placed a dinner order, location of the user, etc.) to determine whether or not the user 302 is eating (e.g., dinner) during output of an instance of an advertisement. Multiple different devices may communicate to determine and/or share environment information. For example, continuing the eating example, a wearable device, on the wrist of the user 302, may determine whether the user 302 is performing eating motions. Although determinations of environment information are shown in FIGS. 4A and 4B as being accomplished by the advertisement server 122, and/or the user device 308, environment information may be additionally or alternatively determined by the advertisement server 122, the statistics database 312, the adjustor 316, and/or any other computing device associated with the user 302, the network 100 and/or the environment 300. The determination of environment information may further comprise a determination (by any of the devices mentioned herein) of the effect the user's environment may have, during output of an instance of a repeat advertisement, on a user's advertisement exposure threshold (for example, as described in more detail with reference to FIGS. 5-7).

At step 432, the user device 308 may determine (e.g., by receiving, by computing, by analyzing, etc.) one or more advertisement characteristics of the advertisement content (e.g., the advertisement content served in step 424). Different devices may determine different advertisement characteristics. For example, at step 420 the advertisement server 122 may optionally determine one or more advertisement characteristics. As the advertisement server 122 may host the advertisement content (e.g., store the advertisement content in memory of the advertisement server 122) and/or process requests for the advertisement content (e.g., as described in step 422), the advertisement server 122 may be well suited to determine one or more advertisement characteristics (e.g., by executing one or more characteristics analyses on each advertisement content). However, one or more advertisement characteristics may be determined by one or more other elements and/or devices. For example, the user device 308 may similarly be well suited for determining one or more advertisement characteristics. Additionally, one or more external devices may be suited to record one or more advertisement characteristics. For example, the user 302 may have a mobile device that is separate from the user device 308. The mobile device may be well suited to determine, for example, a difference in average decibels between the primary content and the advertisement content. Accordingly, the mobile device may determine an average decibel level increase of advertisement content over the primary content. Accordingly, although determinations of advertisement characteristics are shown in FIGS. 4A and 4B as being executed by the advertisement server 122 and/or the user device 308, advertisement characteristics may be additionally or alternatively determined by the statistics database 312, the adjustor 316, and/or any other computing device associated with the user 302, the network 100 and/or the environment 300. Further, the determination of advertisement characteristics information may further comprise a determination (by any of the devices mentioned herein) of the effect of the advertisement characteristics (of a repeat advertisement content) on a user's advertisement exposure threshold (for example, as described with reference to FIGS. 5-7).

At step 434, the user device 308 may send the tracked viewing statistics, the determined environment information, and/or the determined advertisement characteristics to the statistics database 312 (indicated as "SDB" in FIGS. 4A and 4B). Additionally or alternatively, the user device 308) may send additional information (e.g., the frequency cap value) associated with the user 302 and/or the instance of the advertisement content (e.g., the instance of the advertisement served at step 424) to the statistics database 312. Additionally or alternatively, if a different entity (e.g., the advertisement server 122, and/or an additional device) determines environment information, advertisement characteristics information, and/or additional information associated with the user 302 and/or the instance of the advertisement content, the different entity may send the information directly to the statistics database 312. The statistics database 312 may use the information (e.g., a URL) sent by the user device 308 to contact the advertisement server 122 and/or the configuration database 306 to request one or more additional information and/or data (e.g., the frequency cap value).

At step 436, the statistics database 312 may retrieve and/or receive the frequency cap value for the user 302. For example, the statistics database 312 may contact the configuration database 306 to request the most recent frequency cap value for the user 302. Alternatively, the statistics database 312 may contact the advertisement server 122 to request the most recent frequency cap value for the user 302. Additionally or alternatively, the frequency cap value may have been transmitted in step 424 and/or step 434.

As described in relation to FIG. 3, the adjustor 316 may be an element of a computing device that may comprise the statistics database 312, or may be an element of a separate computing device. At step 438, the statistics database 312 may share (e.g., by sending, by sending instructions to retrieve, etc.) the user information and/or the information associated with the instance of the advertisement content. The user information and the information associated with the instance of the advertisement content may comprise, for example, the one or more viewing statistics, the environment information, the one or more advertisement characteristics, the most recent frequency cap value for the user 302, and/or any other information associated with the user 302 and/or the instance of the advertisement content.

At step 440, the adjustor 316 may process (e.g., modify, adjust, update, compute, determine, etc.) an adjusted frequency cap value for the user 302. As described in more detail below, the adjustor 316 may adjust, compute, modify, and/or update the most recent frequency cap value (e.g., predicted frequency cap value, adjusted frequency cap value) based on the one or more viewing statistics, the environment information, and/or the one or more advertisement characteristics. Additional details of how the adjustor 316 may process the adjusted frequency cap value are described below with reference to FIGS. 5-7.

At step 442, the adjustor 316 may send the adjusted frequency cap value to the configuration database 306. The configuration database 306 may replace the previous frequency cap value (e.g., predicted frequency cap value, previous adjusted frequency cap value) with the new adjusted frequency cap value.

Although the above transmissions (e.g., advertisement request, advertisement response, etc.) between devices may be described as single transmission units in each direction, each described transmission may be associated with numerous transmissions back and forth between the devices.

Figure 5:
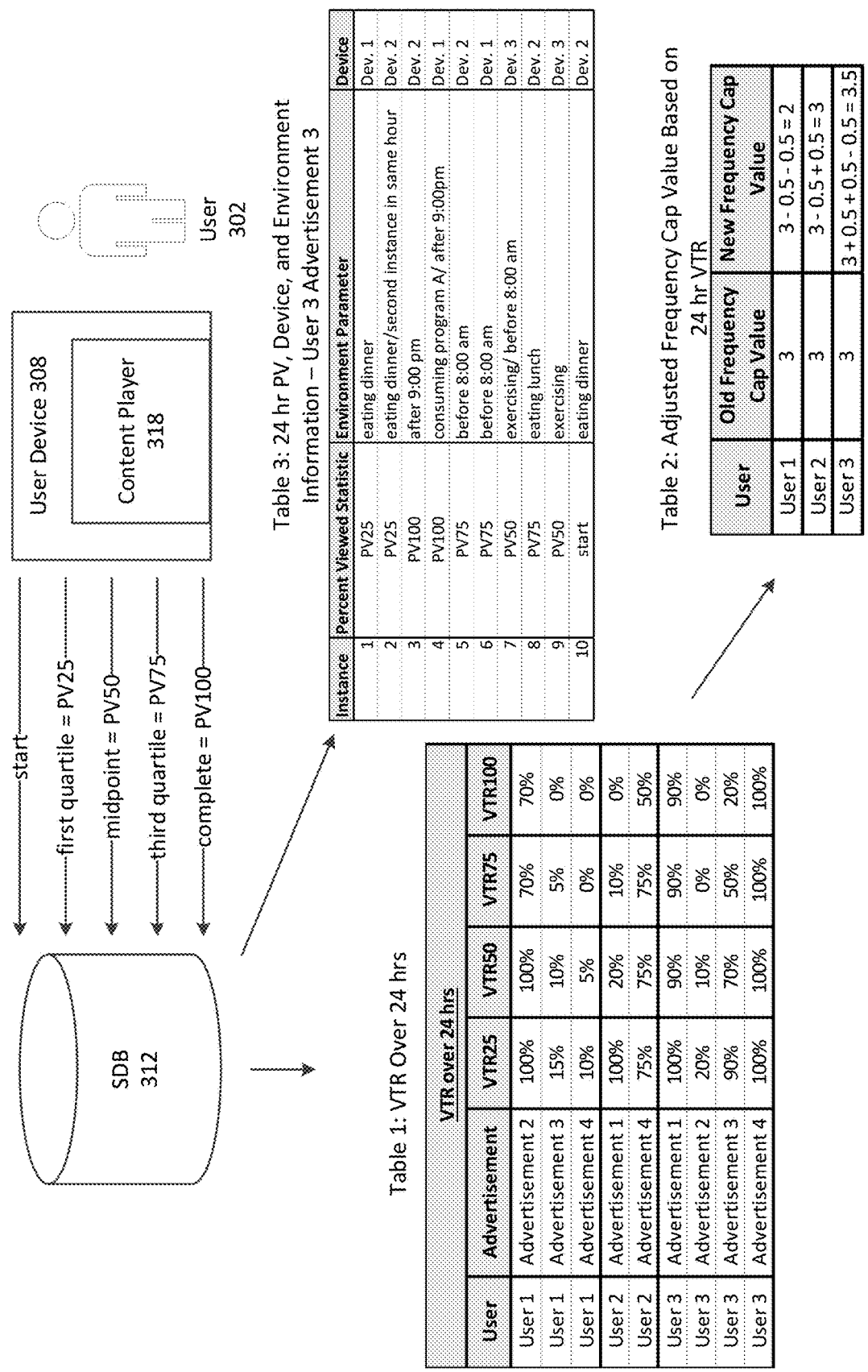
FIG. 5 shows example viewing statistics and example determinations of adjusted exposure threshold values.

FIG. 5 shows example viewing statistics and example determinations of adjusted exposure threshold values. As described herein, one or more viewing statistics for each instance of an advertisement content may be tracked and sent to the statistics database 312. For example, for each output of an instance of an advertisement content, a percentage of the advertisement content that was continuously output without being interrupted (e.g., avoided) may be recorded. For example, a start event may be tracked comprising an indication that playback (e.g., output) of an advertisement content began on content player 318. Additionally, statistics may be tracked at discrete output percentages. For example, an event (e.g., statistic) may be tracked (e.g., recorded, determined) if the advertisement content is output (e.g., without being avoided) for 25% of the total duration. This statistic may be considered a first quartile statistic and/or may be indicated as a percent viewed (PV), in this case, PV25 in FIG. 5. Additional or alternative events may be similarly tracked. For example, events (e.g., statistics) may be tracked if the advertisement content is output for 50% (e.g., midpoint, and/or PV50), 75% (e.g., third quartile, and/or PV75), and/or 100% (e.g., complete, and/or PV100) of the total advertisement content duration. Although not shown in FIG. 5, additional events may be tracked, and one or more shown tracked events may be omitted. Additionally, VTR may be determined over a period of time. Different VTRs for different completion percentages of a repeat advertisement content may be tracked. For example, VTR25 may be the number of instances of a repeat advertisement of which at least 25% of the output of the repeat advertisement content completed without being avoided (e.g., the number of PV25) divided by the total number of output instances of the repeat advertisement content. Similarly, VTR50 may be considered the number of instances of a repeat advertisement of which at least 50% of the output of the repeat advertisement content completed without being avoided (e.g., the number of PV50) divided by the total number of output instances of the repeat advertisement content. Different VTR values may be tracked for different completion percentages. VTR values may be tracked and determined over discrete time periods (e.g., 24 hrs, a week, 72 hrs, etc.) or for the lifetime of a repeat advertisement.

With continued reference to FIG. 5, one or more statistics may be tracked for each instance of a served and/or output repeat advertisement content. The statistics for each instance of the repeat advertisement content may be sent to the statistics database 312. The statistics database 312 may use the tracked viewing statistics to determine (e.g., calculate) an adjusted (e.g., learned and/or modified) frequency cap value for each user (e.g., user 302). Additionally or alternatively, the adjustor 316 may use the tracked viewing statistics to determine (e.g., calculate) an adjusted frequency cap value for each user (e.g., user 302). An adjusted frequency cap value may be determined using methods such as are described in more detail herein. Table 1 in FIG. 5 shows example viewing statistics for three example users (User 1, User 2, and User 3) for four different example repeat advertisement contents (Advertisement 1, Advertisement 2, Advertisement 3, and Advertisement 4) over an example 24-hour period of time. VTR statistics may be determined at discrete view through percentage values (e.g., 25% (VTR25), 50% (VTR50), 75% (VTR75), 100% (VTR100), etc.) for each user, for each advertisement, over a period of time. The recorded statistics may subsequently be used to determine an adjusted frequency cap value for each user.

There are numerous ways to implement such statistics to arrive at an adjusted frequency cap value. For example, referring to FIG. 5, VTR values may be tracked over a period of 24 hrs. VTR thresholds may be determined wherein the frequency cap may be increased for VTR values above a threshold or decreased for VTR values below a threshold. For example, if the VTR25<25% (or some other threshold percentage) for a user for a repeat advertisement content (e.g., the user viewed at least 25% of the output of each instance of a repeat advertisement content less than 25% of the time for the tracked time), the frequency cap value for the user may decrease by a discrete change value (e.g., 0.5). Similarly, if the VTR75>75% (or some other threshold percentage) for a user for a repeat advertisement content (e.g., where the user viewed at least 75% of the output of each instance of a repeat advertisement content more than 75% of the time), the frequency cap value for the user may be increased by a discrete change value (e.g., 0.5). For example, assuming each user in FIG. 5 has a predicted frequency cap value of 3, and assuming an example change value of 0.5, given the example recorded statistics of Table 1, the new adjusted frequency cap values of Table 2 may be determined for each user. For example, User 3 had a VTR25 during the example 24 hrs of 100% for Advertisement 1, 20% for Advertisement 2, 90% for Advertisement 3, and 100% for Advertisement 4. Accordingly (assuming an example change value of 0.5), a change value of −0.5 may be applied to User 3's frequency cap based on the VTR25 of 20% for Advertisement 2. Additionally, User 3 had an example VTR75 of 90%, 0%, 50%, and 100% for Advertisements 1-4 respectively. Accordingly, a change value of +1 may be added to User 3's frequency cap based on VTR75 of 90% and 100% for Advertisements 1 and 4 respectively. Accordingly, in total, User 3's frequency cap may change from 3 to 3.5 during the example 24 hours shown in FIG. 5 given the above example values.

Although FIG. 5 shows an example with three users, the same method may be applied to any number of users. Similarly, although FIG. 5 shows the example implementation with four advertisement contents, the same may be applied to any number of advertisement contents. Although the example implementation of FIG. 5 has been shown over a 24-hour period of time, any period of time may be used (e.g., 12 hrs., 48 hrs., 2 weeks, etc.). Additionally, although FIG. 5, shows a change value applied considering a percentage VTR over a period of time, a change value may be applied following each instance of a repeat advertisement content (e.g., after the recording of each PV value) or after a certain number of served instances and/or outputs of a repeat advertisement content (e.g., change values may be applied after 10 served instances and/or outputs of a repeat advertisement content irrespective of the time over which the 10 instances and/or outputs of the repeat advertisement content were served). Further still, although an example change value of 0.5 has been shown, change values may be further discretized and applied more granularly to each VTR. For example, a VTR25<25% may accompany an example change value of −1, a VTR50<30% may accompany a change value of −0.25, a VTR50>60% may accompany a change value of +0.25, and a VTR75>80% may accompany a change value of +1. Any change value may be applied to any viewing statistic.

As described above, environment information and one or more advertisement characteristics may be determined and associated with each instance and/or output of a repeat advertisement content. Accordingly, each tracked statistic may be associated with environment information and/or one or more advertisement characteristics. Table 3 of FIG. 5 shows an example 24-hour PV, device, and environment information for User 3 for Advertisement 3. As shown in Table 3, User 3 may have been served ten instances of Advertisement 3 in the example 24 hours. Each instance may be associated with environment information. Additionally or alternatively, each instance may be associated with the user device 308 (e.g., example devices "Dev. 1," "Dev. 2," or "Dev. 3" in FIG. 5) via which the instance is output. Frequency cap value determinations may take environment information into account. In Table 3, for example, User 3 has an increased exposure threshold for repeat advertisements after 9:00 pm but has a decreased exposure threshold for repeat advertisements while eating dinner. Accordingly, one or more environment modifiers, based on one or more tracked environment information, may be applied to a user's base adjusted frequency cap value. Environment modifiers may, for example, up modify and/or down modify a user's adjusted frequency cap value based on the environment of a user at the time of an output of an instance of a repeat advertisement content. For example, environment information may be determined by one or more devices as described herein (e.g., "eating dinner") near the time of the advertisement request. If an environment modifier (e.g., up or down modifier) is available for the determined environment information (e.g., if an "after 9:00 pm" modifier is available, and it is after 9:00 pm), the modifier may be applied (e.g., by the advertisement server 122 or the adjustor 316) to the frequency cap value for the advertisement to be served. One or more advertisement characteristics may be similarly associated with each instance of an output advertisement content. In a similar manner to that which is described in relation to environment information, advertisement characteristics may be used to modify base frequency cap values. Environment information, environment modifiers, advertisement characteristics information, and advertisement characteristics modifiers may be implemented and/or used as described in more detail below.

Additionally or alternatively, a particular device associated with the user 302 may be associated with each instance of an output of an advertisement. For example, referring to Table 3 of FIG. 5, the first instance of Advertisement 3 during the example 24 hr. period may be output via Device 1 ("Dev. 1" in FIG. 5) (e.g., a television device) associated with user 302. The second instance of Advertisement 3 during the example 24 hr. period may be output via Device 2 ("Dev. 2" in FIG. 5) (e.g., a mobile device) associated with the user 302. The seventh instance of Advertisement 3 during the example 24 hr. period may be output via Device 3 ("Dev. 3" in FIG. 5) (e.g., a second television device) associated with the user 302. Frequency cap values may be determined and/or used for each particular user device (e.g., for each of Dev. 1, Dev. 2, and Dev. 3). For example, different frequency cap values may be determined and/or used for each of multiple different user devices associated with the user 302, and/or for each of multiple different groups of user devices associated with the user 302. Additionally or alternatively, frequency cap values may be determined and/or used for all devices associated with the user 302 (e.g., all of Dev. 1, Dev. 2, and Dev. 3). Additionally or alternatively, frequency cap values may be determined and/or used for a portion of the devices associated with the user 302, for example, all devices of a same type (e.g., Dev. 1 and Dev. 3).

FIG. 6 shows example partial user exposure threshold value profiles for multiple users. A profile may be stored for each user. For example, each user profile may comprise user demographic information (e.g., age, gender, salary range, interests, race, etc.). Additionally, each user profile may further comprise one or more base advertisement user exposure threshold values. For example, each user profile may have one or more of a base adjusted frequency cap value, a base advertisement content to time ratio value, a base advertisement content to time of primary content viewed ratio value, a number of advertisements per number of primary contents viewed, etc. Additionally, each user profile may further comprise one or more determined environment modifiers. For example, each user may have any number of environment modifiers associated with their profile, and each environment modifier may be associated with environment information. During environment modifier training, machine learning may be used to determine potential significant environment modifiers for each user. Subsequently, it may be determined that some environment conditions correlate to significant deviation from the base exposure threshold value for the user. That which is deemed a significant deviation may be determined or may be set by, for example, a system administrator. The environment information associated with significant deviation from the base exposure threshold value may be used to modify frequency cap values. Environment modifiers to be tracked and/or used to modify a user's adjusted frequency cap value may be set by, for example, a system administrator. For example, a system administrator may identify particular environment information to be tracked (e.g., time of day, the type of primary content that was interrupted, etc.) and used to modify the base adjusted frequency cap value. The tracked environment modifiers may be applied where the deviation from the base frequency cap value for the particular modifier is significant. Additionally or alternatively, the environment modifiers may be applied irrespective of base frequency cap deviation significance.

With continued reference to FIG. 6, user profiles may further comprise one or more advertisement characteristics modifiers. Like environment modifiers, one or more advertisement characteristics may be tracked in relation to each viewing statistic. Advertisement characteristics may comprise one or more characteristics of an advertisement content, for example, advertisement genre, average advertisement content volume increase, advertisement content color scheme, advertisement subject, advertisement theme and/or other characteristics. Similar to environment modifiers, advertisement characteristics modifiers may be adjusted and implemented in numerous different ways. For example, a machine learning algorithm may be applied to determine which advertisement characteristics may be of significance for a particular user. Alternatively, particular advertisement characteristics (e.g., advertisement content genre, advertisement content product types, etc.) may be tracked based on, for example, a system administrator setting. Deviations deemed significant may be applied to modify the base user exposure threshold value. Alternatively, all advertisement characteristics set by a system administrator may be tracked and applied to modify the base user exposure threshold value.

Environment and advertisement characteristics modifiers may be used in a number of different ways. For example, each user profile may comprise a base user exposure threshold value (e.g., frequency cap value). Modifiers (e.g., environment modifiers and/or advertisement characteristics modifiers) may be applied to the base value as multipliers. FIG. 6 shows multiple example frequency caps, environment modifiers and advertisement characteristics modifiers. For example, referring to FIG. 6, User 1 has a base frequency cap value for repeat advertisement instances of 4. Additionally, User 1 has the following determined modifiers: 1) on the den display device: 1.05; 2) while eating dinner: 0.5; 3) car advertisement content: 1.25; 4) cool color scheme: 1.1. Accordingly, with the modifiers tracked and applied as multipliers, a final frequency cap value for a repeat car advertisement having a cool color scheme while User 1 is eating dinner while viewing the output of an instance of the advertisement on the den display device may be: (4)*(1.05)*(0.5)*(1.25)*(1.1)=2.9. Additionally or alternatively, modifiers (environment modifiers and advertisement characteristics modifiers) may be added and/or subtracted from a base exposure threshold value (e.g., frequency cap value). For example, User 2 has the following determined modifiers: 1) on the den display device: +0.1; 2) while eating dinner: −2; 3) car advertisement content: +0.5; 3) cool color scheme: +0.2. Accordingly, with the modifiers applied as additives and/or subtractives, a final frequency cap value for User 2 for the repeat car advertisement having a cool color scheme while User 2 is eating dinner while viewing the advertisement on the den display device may be: 3+0.1−2+0.5+0.2=1.8.

Instead of or in addition to modifying base adjusted frequency cap values based on environment and advertisement characteristics, environment specific adjusted frequency cap values and/or advertisement characteristics specific adjusted frequency cap values may be used. Environment specific adjusted frequency cap values may be, for example, frequency cap values determined for particular environment conditions, and advertisement characteristics specific adjusted frequency cap values may be frequency cap values determined for advertisements having specific advertisement characteristics. For example, User 3 may have different adjusted frequency cap values associated with different environmental information. User 3 may have one environment specific adjusted frequency cap value for the environment information (e.g., environment condition) of "eating dinner," and a second different adjusted environment specific frequency cap value for the environment information (e.g., environment condition) of "after 9:00 pm." Environment specific frequency cap values and advertisement characteristics specific frequency cap values may be combined to modify one another for different environment and advertisement characteristics combinations.

Similar to that which is described in relation to environment information, base adjusted frequency cap values may be, additionally or alternatively, modified based on advertisement characteristics. The method for using environment information and/or advertising characteristics information to determine adjusted frequency cap values (e.g., using a multiplier formula, using an additive formula, or using specific frequency cap values) may be selected for users, for example, by a system administrator. Additionally, three different methods of using environment information and advertisement characteristics information are shown in FIG. 6. A multiplier formula is shown for User 1, an additive formula is shown for User 2, and specific adjusted frequency cap values are shown for User 3. The different methods are shown for different users for example purposes. Any method may be used for any user. Any number of different methods may be used for different users. Any single method may be used for all users.

Advertisement contents may be a part of an advertising campaign. An advertising campaign may be a marketing plan of action by an advertiser. Different advertisement campaigns may have different structures and goals. For example, brand advertisement campaigns may be associated with high cost per mile (CPM), a pricing model where the advertiser may pay per a certain number of times the advertisement content is served. In an alternative model, an advertiser may only pay when a measurable result is achieved, for example, when a certain percentage of an advertisement content has been output to a user without being avoided (or some other measurable result). An example of such a campaign may be a performance-based advertisement campaign. Some advertisement campaigns may be associated with exposure threshold settings (e.g., frequency cap values), while other advertisement campaigns may not. VTR and/or other viewing statistics may be gathered based on advertisement campaigns with frequency cap settings and may also be gathered based on advertisement campaigns without frequency cap settings. An advantage of gathering VTR and/or other viewing statistics based on advertisement campaigns with frequency cap settings is that the ultimate adjusted frequency cap value may be used in similar campaigns with similar goals. An advantage of gathering VTR and/or other viewing statistics based on advertisement campaigns without frequency cap settings is that instances of such repeat advertisements may be output to users more often, which may allow for gathering more data. For example, if a user's exposure threshold for repeat advertisements increases (e.g., the user's adjusted frequency cap increases), such an increase may be measured based on an advertisement campaign without a frequency cap setting in the first place (e.g., the advertisement campaign will not be cut off by the user's present frequency cap setting). "Training rounds" of repeat advertisement content not subject to frequency cap settings may be used to update (e.g., train) adjusted frequency cap values settings. Training rounds may be conducted every set period of time (e.g., every week, every two weeks, every day, etc.). Additionally or alternatively, some training rounds may target specific environment information and/or specific advertisement characteristics. For example, training rounds may be conducted to target a user's frequency exposure threshold for repeat advertisements while eating dinner.

Figure 7:
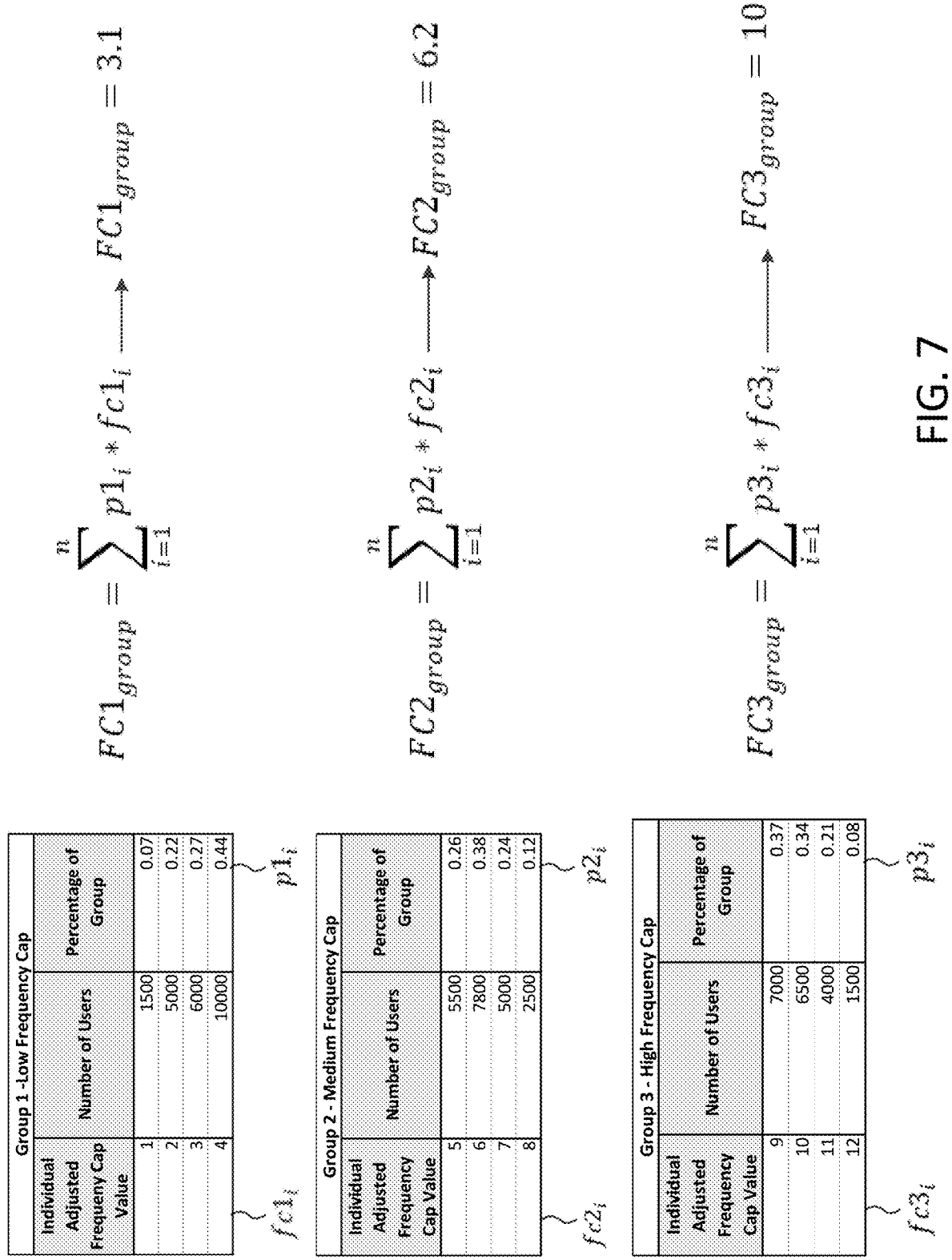
FIG. 7 shows example calculations of adjusted exposure threshold values.

FIG. 7 shows an example determination and use of adjusted frequency values. Users may be grouped based on individual adjusted (e.g., learned and/or modified) frequency cap values, and a single (e.g., combined) improved group adjusted frequency cap value may be determined and used for all users of a group. Implementing adjusted frequency cap values on a group level may be associated with reduced accuracy but may, advantageously, also be associated with reduced computing resource use. Individual adjusted frequency cap values may be determined for each user of a plurality of users. Individual adjusted frequency cap values may be determined, for example, as described with reference to FIG. 5. A range of individual adjusted frequency cap values for the plurality of users may result. For example, FIG. 7 shows users having an example range of individual adjusted frequency cap values from 1-12.

Users may be grouped based on their individual adjusted frequency cap values. Referring to FIG. 7, three example groups are shown: Group 1—Low Frequency Cap; Group 2—Medium Frequency Cap; and Group 3—High Frequency Cap. In the example of FIG. 7, all users with an individual adjusted frequency cap value in the range of 1-4 may be assigned to and/or placed into Group 1. All users with an individual adjusted frequency cap value in the range of 5-8 may be assigned to and/or placed into Group 2. All users with an individual adjusted frequency cap value in the range of 9-12 may be assigned to and/or placed into Group 3. The ranges shown in FIG. 7 are for purposes of example only. Three groups are shown in FIG. 7 for case of understanding and explanation; however, any number of groups may be used. Each group may comprise any range of individual adjusted frequency cap values, and each group may contain any number of users.

A single (e.g., combined) group adjusted frequency cap value may be determined for each group based on the individual adjusted frequency cap value of each user in the group. The single (e.g., combined) group adjusted frequency cap value may be used for each user of the group. For each group, a number of users at each individual adjusted frequency cap value may be determined. Referring to example Group 1 of FIG. 7, it may be determined that 1,500 users have an individual adjusted frequency cap value of 1, 5,000 users have an individual adjusted frequency cap value of 2, 6,000 users have an individual adjusted frequency cap value of 3, and 10,000 users have an individual adjusted frequency cap value of 4. Additionally, the percentage of users of the group of users at each individual adjusted frequency cap value may be determined. For each adjusted frequency cap value of a group, that percentage may, for example, be a value equal to (number of users at individual adjusted frequency cap value)÷(total number of users in the group). Referring to example Group 1 of FIG. 7, for example, 7 percent (0.07) (1,500÷22,500) of the users have an individual adjusted frequency cap value of 1, 22 percent (0.22) (5,000÷22,500) of the users have an individual adjusted frequency cap value of 2, 27 percent (0.27) (6,000÷22,500)

of the users have an individual adjusted frequency cap value of 3, and 44 percent (0.44) (10,000÷22,500) of the users have an individual adjusted frequency cap value of 4.

With the above information, a single (e.g., combined) group adjusted frequency cap value may be determined. For example, a group adjusted frequency cap value may be determined using the following formula:

$$FC_{group} = \sum_{i=1}^{n} p_i * fc_i,$$

where $p_i$ refers to the percentage of users of the group with an individual adjusted frequency cap value at $fc_i$. For example, referring to FIG. 7, $FC1_{group}$ (combined group frequency value for Group 1) may be determined where $FC1_{group}$ $\Sigma_{i=1}^{n}$ $p1_i*f1c_i$. Applying the numbers described above and in FIG. 7, $FC1_{group}=3.1$. Thus, example Group 1 may comprise users having individual adjusted frequency cap values from 1 to 4. Based on the combined group adjusted frequency cap determination, the frequency cap value of 3.1 (or a rounded number, for example, 3) may be used for each user in Group 1.

The example of FIG. 7 is simplified for ease of understanding and explanation. Adjusted frequency cap values can be any value. Additionally, there may be any number of groups of users, and each group may comprise any range of individual adjusted frequency cap values. Additionally, users may switch between groups if their adjusted frequency cap value changes (for example, a user's individual adjusted frequency cap value may change as a consequence of one or more training rounds described above). If a user switches between groups, the user may be subject to a buffer period where the frequency cap value used for the user may be the user's individual adjusted frequency cap value (as opposed to the group adjusted frequency cap value of the user's new group). Following the buffer period, the group adjusted frequency cap value of the user's new group may be used for the user (like the rest of the group). Alternatively, during the buffer period, the frequency cap value used for the user that switched groups may gradually change (e.g., over a period of two weeks) from the user's individual adjusted frequency cap value to the group adjusted frequency cap value of the user's new group. Accordingly, the user may experience a more gradual change in frequency cap value if transitioning between groups. Alternatively, a buffer period may not be used.

Exposure threshold values (e.g., frequency cap values) may be used to provide new and/or optimized advertisement revenue models. For example, as described for performance-based advertisements, the advertiser may only pay when a measurable result is achieved. Accordingly, exposure tolerance values (e.g., frequency cap values) may be used to increase revenue. Additionally, environment information and/or ad characteristics information may be used to improve advertising revenues. For example, certain advertisements may be served to a user during one environment condition (e.g., after 9:00 pm) as opposed to another environment condition (e.g., while eating dinner) if it is known that a person has an increased and/or decreased exposure threshold during one environment condition. Additionally or alternatively, advertisers may be given the option to pay more or less for training rounds.

Figure 8A:
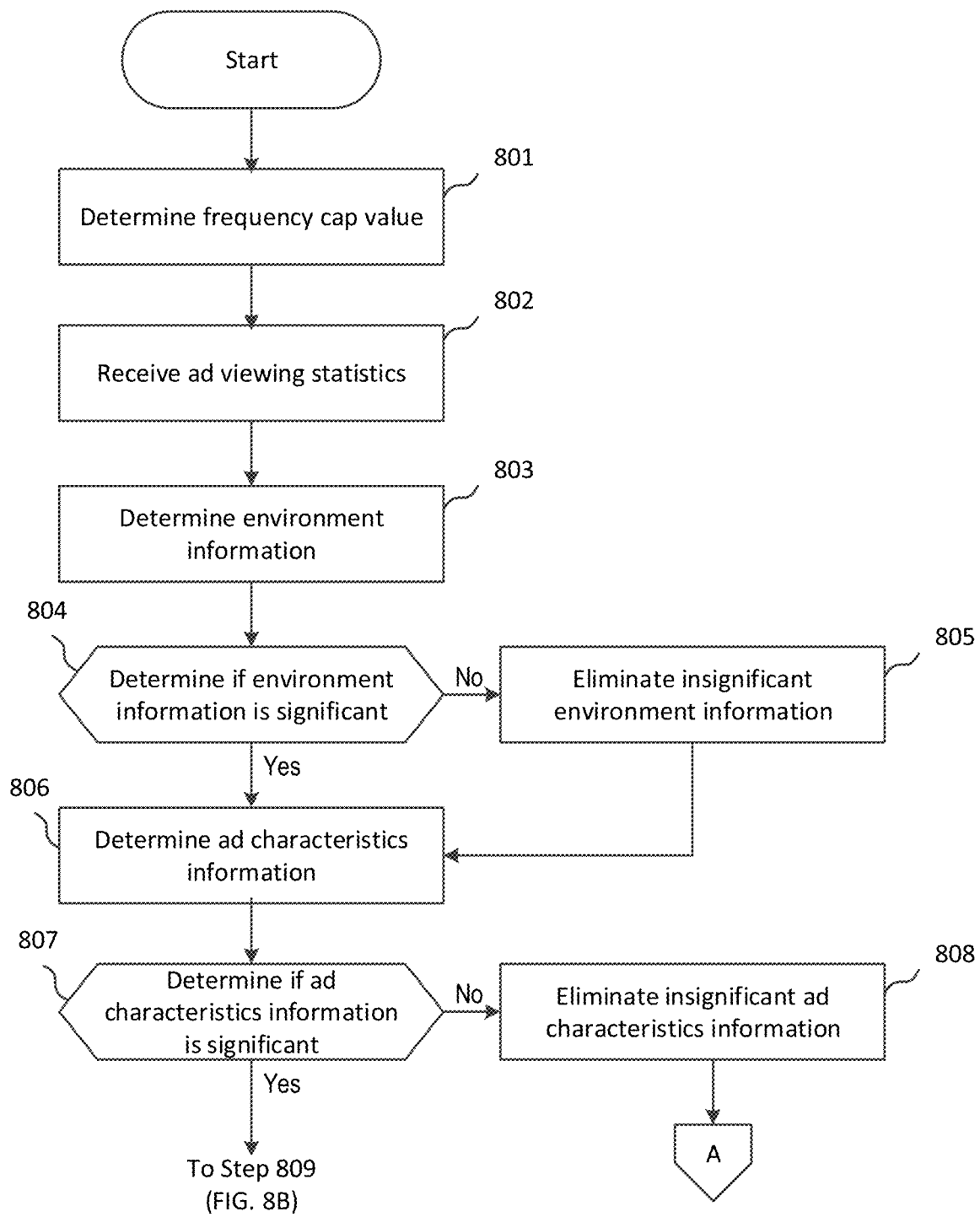
FIGS. 8A-8B are a flow chart showing steps of an example method associated with adjusted advertisement exposure values.
Figure 8B:
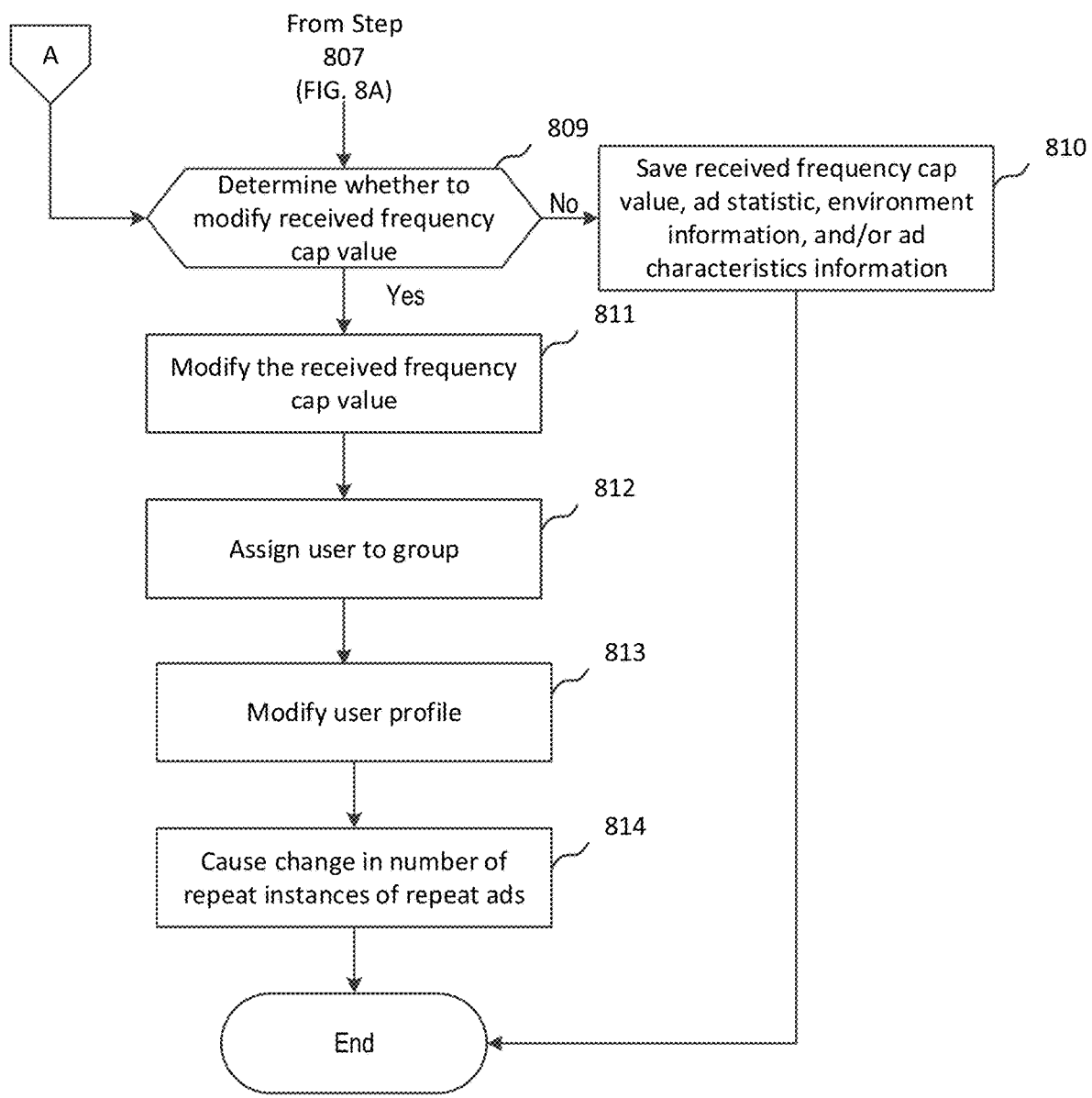

FIGS. 8A-8B are a flow chart showing steps of an example method associated with adjusted advertisement exposure values. One, some, or all steps of the example method of FIGS. 8A-8B may be performed by a computing device (e.g., the adjustor device 316). Also or alternatively, one, some, or all steps of the example method of FIGS. 8A-8B may be performed by one or more other computing devices (e.g., statistics database 312 and/or configuration database 306). Steps of the example method of FIGS. 8A-8B may be omitted, performed in other orders, and/or otherwise modified, and/or one or more additional steps may be added.

In step 801, the computing device may determine (e.g., by receiving, by retrieving) a frequency cap value for one or more users. The frequency cap value for each user may comprise a predicted frequency cap value or an adjusted frequency cap value. The frequency cap value may comprise an example of a user exposure threshold value. The frequency cap value may comprise a cap on the number of instances the same advertisement may be output to the same user. For example, the frequency cap value may comprise a value that indicates a number of times that the same advertisement may be output to a single user. The frequency cap value may be associated with a single device associated with a user, all of a plurality of devices associated with a user, or with a portion of a plurality of devices associated with a user. Step 801 may be comprised by step 416 of FIG. 4A, step 436 of FIG. 4B and/or step 438 of FIG. 4B.

In step 802, the computing device may receive (e.g., by receiving, by determining, and/or evaluating) one or more advertisement viewing statistics. The one or more advertisement viewing statistics may comprise information about an interaction of a user with an output of an instance of a repeat advertisement content. Step 802 may be comprised by steps 434 and/or step 438 of FIG. 4B. Advertisement viewing statistics may comprise and/or be comprised by one or more of the advertisement viewing statistics as described with reference to FIGS. 5-7.

In step 803, the computing device may determine (e.g., by receiving, determining, and/or evaluating) environment information. The environment information may comprise one or more environment parameters. The environment information may comprise environment information associated with the environment of a user during the output of an instance of a repeat advertisement. For example, the environment information (e.g., one or more environment parameters) may comprise information associated with at least one of, for example, a time of day, a user activity, and/or a device used during the output of the instance of the repeat advertisement content. Step 803 may be comprised by step 418 of FIG. 4A and/or steps 430, 434 and/or 438 of FIG. 4B. The determination of environment information may further comprise a determination of the effect the environment of a user during output of an instance of a repeat advertisement may have on the advertisement exposure threshold of a user.

In step 804, the computing device may determine whether the environment information is significant. The determination of environment information significance may be based on one or more system settings (e.g., a setting that says certain environment information should not be tracked for one or more users). Additionally or alternatively, environment information significance may be determined based on the determination of the effect the environment may have had on the advertisement exposure threshold of a user. If the computing device determines that the environment information is insignificant, the computing device may perform step 805 and eliminate (e.g., delete) the insignificant environment information and continue to perform step 806. If the computing device determines that the environment information is significant, step 806 may be performed.

In step 806, the computing device may determine (e.g., by receiving, determining, and/or evaluating) advertisement content characteristics information (e.g., advertisement characteristics information). The advertisement characteristics information may comprise information associated with one or more advertisement characteristics of the repeat advertisement content. For example, the advertisement characteristics information may comprise information about at least one of an advertisement genre, an advertisement subject, and advertisement theme, or an advertisement color scheme. Step 806 may be comprised by step 420 of FIG. 4A and/or steps 432, 434 and/or 438 of FIG. 4B. The determination of advertisement characteristics information may further comprise a determination of the effect the advertisement characteristics may have on the advertisement exposure threshold of a user (e.g., exposure threshold for instances of repeat advertisements).

In step 807, the computing device may determine whether the advertisement characteristics information is significant. The determination of advertisement characteristics information significance may be based on one or more system settings (e.g., a setting that certain advertisement characteristics information should not be tracked for one or more users). Additionally or alternatively, advertisement characteristics information significance may be determined based on the determination of the effect the advertisement characteristics may have had on the advertisement exposure threshold of a user. If the computing device determines that the advertisement characteristics information is insignificant, the computing device may perform step 808 and eliminate (e.g., delete) the insignificant advertisement characteristics information and continue to perform step 809. If the computing device determines that the environment information is significant, step 809 may be performed.

In the step 809 (FIG. 8B), the computing device may determine whether to modify the received and/or retrieved frequency cap value (e.g., the frequency cap value from step 801). For example, the determination on whether to modify the received frequency cap value may be based on a significance determination of one or more of the received viewing statistics. For example, the computing device may determine if a received viewing statistic is significant. If it is determined that the received viewing statistic is significant, the computing device may use the viewing statistic to modify the frequency cap value. Significance may be based on one or more thresholds and may be set by, for example, a system administrator. The computing device may use additional or alternative significance information in determining whether to modify the retrieved frequency cap value. For example, the computing device may use a significance determination. The significance determination may be associated with one or more of the determined environment information, information associated with the device of the user, and/or the determined advertisement characteristics information. Additionally, the determination on whether to modify the frequency cap value may be further based on one or more additional criteria. The one or more additional criteria may, for example, comprise: a number of received advertisement statistics for a repeat advertisement content over a period of time (e.g., a number of advertisement viewing statistics for a single repeat advertisement content over a period of 24 hours); a number of received advertisement statistics for a repeat advertisement content irrespective of time (e.g., the computing device may determine to modify the received frequency cap after receiving 5 viewing statistics for a repeat advertisement content); the time since the last modification to the frequency cap value; and/or receiving a viewing statistic for a repeat advertisement content (e.g., the computing may determine to modify the received frequency cap after receiving a single viewing statistic for a repeat advertisement content). Step 809 may be comprised by step 440 of FIG. 4B.

If, in step 809, the computing device determines to not modify the received frequency cap value, the computing device may perform step 810 and save (e.g., for use in a later performance of step 809) one or more of the received frequency cap values, the received advertisement statistic, the determined environment information, and/or the determined advertisement characteristics information. Based on performing step 810, the method of FIGS. 8A-8B may end. If, in step 809, the computing device determines to modify the received frequency cap value, step 811 may be performed.

In step 811, the computing device may modify the received and/or retrieved (e.g., predicted or adjusted) advertisement frequency cap value. If the received advertisement frequency cap value (e.g., in step 801) is a predicted advertisement frequency cap value, the computing device may modify the predicted advertisement frequency cap value to an adjusted advertisement frequency cap value (for example as described with respect to FIGS. 5-7). If the received advertisement frequency cap value (e.g., in step 801) is an adjusted advertisement frequency cap value, the computing device may modify the received adjusted advertisement frequency cap value to a new adjusted advertisement frequency cap value. The adjusted (or new adjusted) advertisement frequency cap value may be based on the viewing statistics (for example, as described with respect to FIGS. 5-7). In addition to the viewing statistics, the adjusted (or new adjusted) advertisement frequency cap value may be based on one or more of the determined environment information, the device via which the advertisement was output, and/or one or more advertisement characteristics (e.g., advertisement characteristics information). Step 811 may be comprised by step 440 of FIG. 4B. Modification of the advertisement frequency cap value may comprise determinations such as those described with respect to FIGS. 5-7.

Additionally or alternatively, in step 811, the computing device may modify, for one or more users of a plurality of users, the received (e.g., predicted or adjusted) one or more advertisement frequency cap values to adjusted (or new adjusted) advertisement frequency cap values. The adjusted (or new adjusted) advertisement frequency cap value for each of the plurality of users may be based on one or more interactions of the one or more users of the plurality of users with one or more instances of a repeat advertisement content. The adjusted (or new adjusted) advertisement frequency cap value may further be determined based on an amount of time over which the interactions of the one or more users took place. Further still, the computing device may determine a combined group adjusted advertisement frequency cap value for the plurality of users based on a number of users at each individual adjusted advertisement frequency cap value. The combined group adjusted advertisement frequency cap value determination may further be based on a percentage of users at each individual adjusted advertisement frequency cap value in the group.

In step 812, the computing device may assign a user to a group based on the user's individual adjusted advertisement frequency cap value. For example, the computing device may determine (e.g., by receiving) a plurality of individual adjusted frequency cap values for a plurality of users. The computing device may assign the user and/or each of the plurality of users to groups based on the plurality of individual adjusted advertisement frequency cap values. Step 812 may be comprised by step 440 of FIG. 4B.

In step 813, the computing device may modify (e.g., update, edit) a user profile based on the adjusted advertisement frequency cap value. Additionally, in step 813, the computing device may update a user profile based on the environment information and/or the advertisement characteristics information. Updating a user profile based on the environment information may comprise modifying an existing, or determining a new, environment modifier value comprising a value by which an advertisement frequency cap value may be modified based on the environment information. Updating a user profile based on the advertisement characteristics information may comprise modifying an existing, or determining a new, advertisement characteristics modifier value comprising a value by which an advertisement frequency cap value may be modified based on the advertisement characteristics information. Step 813 may be comprised by step 440 of FIG. 4B.

In step 814, the computing device may cause a change in a number of instances a repeat advertisement may be shown to a user and/or a group of users. For example, the computing device may send, and/or cause to be sent, the adjusted (or new adjusted) advertisement frequency cap value to an advertisement server (e.g., the advertisement server 122). The adjusted advertisement frequency cap value may comprise an advertisement frequency cap value for a user. Additionally or alternatively, the adjusted advertisement frequency cap value may comprise a combined adjusted frequency cap value for a group of users (e.g., as shown in FIG. 7). The advertisement server may change (e.g., increase or decrease) an allowed quantity of outputs of an advertisement to a user and/or a group of users based on the adjusted advertisement frequency cap value.

Figure 9:
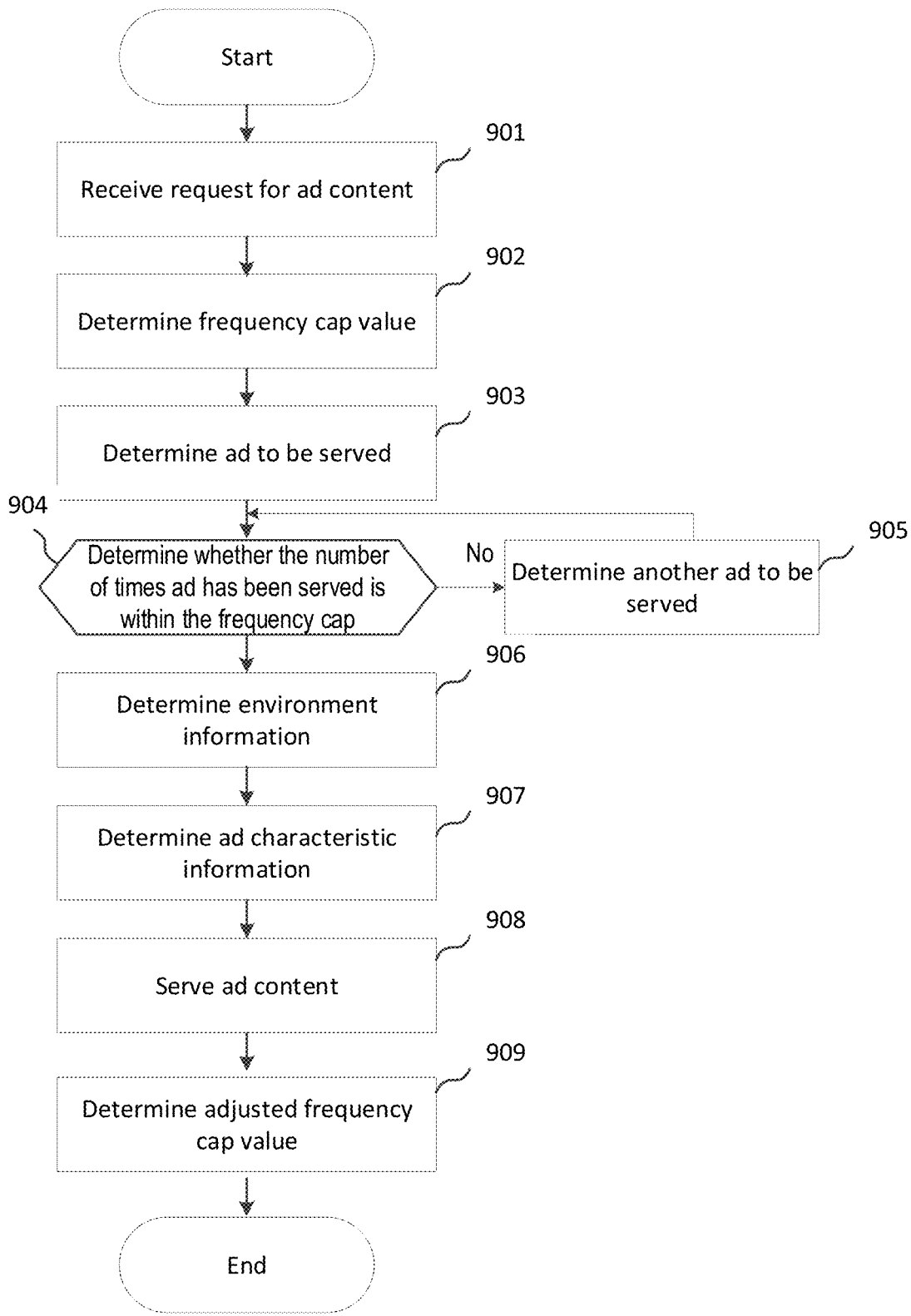
FIG. 9 is a flow chart showing steps of an example method associated with adjusted advertisement exposure values.

FIG. 9 is a flow chart showing steps of an example method associated with adjusted advertisement exposure values. One, some, or all steps of the example method of FIG. 9 may be performed by a computing device (e.g., the advertisement server 122). Also or alternatively, one, some, or all steps of the example method of FIG. 9 may be performed by one or more other computing devices (e.g., the statistics database 312, the configuration database 306, and/or the adjustor 316). Steps of the example method of FIG. 9 may be omitted, performed in other orders, and/or otherwise modified, and/or one or more additional steps may be added.

In step 901, the computing device (e.g., the advertisement server 122) may receive a request to serve an advertisement. The request to serve an advertisement may comprise a request to serve an instance of a repeat advertisement. The request to serve an advertisement may comprise a VAST request. The request for an advertisement content may be made by a user device (e.g., a video content player, a set-top box, a mobile device, etc.). The computing device may associate the request with the user device and/or with the user of the user device. Step 901 may be comprised by step 414 of FIG. 4A.

In step 902, the computing device may determine (e.g., by receiving, by evaluating) a frequency cap value for a user. The frequency cap value may comprise a predicted frequency cap value or an adjusted frequency cap value. The frequency cap value may comprise an example of a user advertisement exposure value. The frequency cap value may comprise a cap on the number of instances the same advertisement may be output and/or served to the same user. The frequency cap value may be associated with a single user device, all of a plurality of different user devices, or with a portion of the plurality of different user devices. Step 902 may be comprised by step 416 of FIG. 4A.

In step 903, the computing device may determine an advertisement to be served. The determination of an advertisement to be served may be based on the request for an advertisement. The determination of an advertisement to be served may be in response to the request for an advertisement. The determination of an advertisement to be served may be based on one or more advertisement serving criteria (e.g., location of the user, target audience of the advertisement campaign, relevance of the advertisement campaign, one or more user demographics, revenue goals of the advertisement campaign, environment information, advertisement characteristics, etc.). Additionally, the determination of an advertisement to be served may be based on the device from which the request originated. Following the determination of an advertisement to be served, the computing device may have determined one or more of the best advertisements to be served to the user. The one or more of the best advertisements to be served may be based on the one or more advertisement serving criteria. The one or more best advertisements to be served may be in a ranked list of best advertisements to be served. Step 903 may be comprised by step 422 of FIG. 4A.

In step 904, the computing device may determine whether a number of times the advertisement to be served has been served to the user is within the frequency cap value for the user. The computing device may determine (e.g., by receiving a value comprising) a number of times the advertisement has been served and/or output to the user. If the number of times the advertisement has been served to the user is greater than the advertisement frequency cap value for the user, the computing device may perform step 905 and determine another advertisement to be served. The another advertisement to be served may be the next best advertisement from the list of advertisements determined in step 903. Step 904 may be repeated. If the number of times the advertisement has been served to the user is less than the advertisement frequency cap value for the user, step 906 may be performed. Step 904 may be comprised by step 422 of FIG. 4A.

In step 906, the computing device may determine (e.g., by receiving, determining, and/or evaluating) environment information. The environment information may comprise one or more environment parameters. The environment information may comprise environment information associated with the environment of a user associated with the output of an instance of a repeat advertisement. For example, the environment information (e.g., parameters) may comprise information associated with at least one of, for example, a time of day, a user activity, and/or a device used when the computing device serves an instance of an advertisement content to a user (e.g., to a user device). Step 906 may be comprised by step 418 of FIG. 4A and/or steps 430, 434 and/or 438 of FIG. 4B.

In step 907, the computing device may determine (e.g., by receiving, determining, and/or evaluating) advertisement characteristics information (e.g., advertisement characteristics information). The advertisement characteristics information may comprise information associated with one or more advertisement characteristics of the repeat advertisement. For example, the advertisement characteristics information may comprise information about one or more of an advertisement genre, an advertisement subject, and advertisement theme, or an advertisement color scheme. Step 907 may be comprised by step 420 of FIG. 4A and/or steps 432, 434 and/or 438 of FIG. 4B.

At step 908, the computing device may serve the advertisement content. Serving the advertisement content may comprise generating an advertisement response (e.g., a VAST response). Further, serving an advertisement content may comprise sending an instance of the advertisement content and/or sending information for advertisement content retrieval (e.g., a URL from which the advertisement content may be retrieved). The advertisement content may comprise a repeat advertisement content. In addition to serving the advertisement content, the computing device may send (e.g., with an advertising response) instructions to track a viewing statistic. A viewing statistic may comprise a VTR. A viewing statistic may alternatively comprise a view through percentage (e.g., a PV) of an instance of an output of the repeat advertisement content. The view through percentage may comprise a percentage of the instance of the advertisement content viewed by, and/or output to, the user without avoiding (e.g., skipping, changing programming, changing the channel) the advertisement content. The view through percentage may be tracked at predetermined intervals (e.g., whether 25%/PV25, 50%/PV50, etc. of the advertisement content was output to the user). Additionally, serving the advertisement content may further comprise sending additional information, for example, user identifying information, and/or user device identifying information. Step 908 may be comprised by step 424 of FIG. 4A.

In step 909, the computing device may determine (e.g., by receiving, by evaluating, and/or by determining) an adjusted frequency cap value based on the received frequency cap value (e.g., the advertisement frequency cap value of step 902) and the viewing statistic. Additionally, the computing device may determine the adjusted frequency cap value based on the determined environment information (e.g., determined in step 906) and/or the determined advertisement characteristics information (e.g., determined in step 907). The adjusted frequency cap determined in step 909 may be used in a subsequent (e.g., another) request for an advertisement from a device of the user (e.g. in one or more additional iterations of one or more of the steps of FIG. 9). Step 909 may be comprised by step 442 of FIG. 4B.

Messages and/or communications described herein may be via any protocol and/or formatting structure. For example, one or more messages and/or communications described herein may comprise and/or be comprised by Video Ad Serving Template (VAST) messages, Society of Cable Telecommunications Engineers (SCTE) messages, Video Player Ad Interface Definition (VPAID) messages, Secure Interactive Media Interface Definition (SIMID) messages, Open Measurement (OM) messages, Video Multiple Ad Playlist (VMAP) messages, Mobile Rich Media Ad Interface Definitions (MRAID) messages, etc. For example, one or more messages and/or communications described herein may comprise and/or be comprised by a VAST request (e.g., a VAST request for an advertisement), a VAST response (e.g., a response to a request for an advertisement), an SCTE 35 message (e.g., an advertisement cue message), an SCTE 224 message, an SCTE 130 message, etc. Additionally, messages and/or communications described herein may be communicated via any network and/or communication technology. For example, messages and/or communications described herein may be unicast, broadcast, multicast (e.g., IP multicast, e.g., Any Source Multicast (ASM), Source Multicast (SSM), etc.), etc. Additionally, messages and/or communications described herein may be via any protocol related to such network and/or communication technologies, for example, Internet Group Management Protocol (IGMP), Protocol Independent Multicast Sparse Mode (PIM SM), etc.

Although examples may be given with respect to certain devices and/or locations performing steps, those skilled in the art recognize that any steps described herein may be performed by one or more of any devices in any location in the communication network. For example, messages associated with advertisements, advertisement decisions, and/or actions relating to advertisements (e.g., advertisement requests, advertisement selection, advertisement insertion, etc.) may be via any computing device described herein and at any location in the network described herein. For example, messages associated with advertisements, advertisement decisions, and/or actions relating to advertisements may be via one or more devices at one or more distribution facilities (e.g., a headend, a local office, etc.). Additionally or alternatively, messages associated with advertisements, advertisement decisions, and/or actions relating to advertisements described herein may be via one or more user devices (e.g., one or more devices at user premises, a set-top box (STB), a user mobile device, a gateway, etc.).

Methods, systems, and devices for determining and utilizing modified frequency cap values have been described. It should be understood that frequency cap values may comprise an example of advertisement exposure threshold values. Portions of the present disclosure are described in relation to frequency cap values, the same may be applied for any advertisement exposure threshold value. For example, the herein-described methods, systems, and devices may be used to determine and/or use one or more of: a user's exposure threshold for a number of advertisement contents to time of primary content consumed ratio; a user's exposure threshold for a time of advertisement content consumed to time ratio; a user's exposure threshold for a time of advertisement content consumed to time of primary content consumed ratio; and/or a user's exposure threshold for a number of advertisement contents per number of primary content consumed. The above list is not intended to be limiting and additional types of advertisement exposure threshold values may be determined and/or used based on the herein-described methods, systems, and devices.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a server of a content network, and for each user of a plurality of users associated with the content network, a corresponding individual frequency cap value, each individual frequency cap value indicating a quantity of allowable outputs of content for a respective user, wherein each individual frequency cap value is based on interaction information received from one or more output computing devices associated with the plurality of users;
   storing, in a configuration database of the server, the individual frequency cap values;

assigning, by the server, to a group, and based on the individual frequency cap values stored in the configuration database, the plurality of users;

determining, by the server, a combined frequency cap value for all of the plurality of users assigned to the group, the combined frequency cap value being determined based on:

the individual frequency cap values for each of the plurality of users assigned to the group; and a quantity of users assigned to the group;

receiving, by the server, from the one or more output computing devices, a request to output content, wherein the request comprises information that identifies the one or more output computing devices; and causing, based on the combined frequency cap value for all of the plurality of users assigned to the group, and based on the information that identifies the one or more output computing devices, selection of a content item that is sent to the one or more output computing devices for outputting the content.

2. The method of claim 1, wherein the individual frequency cap values and the combined frequency cap value are associated with environment information that indicates one or more of:

one or more times of day associated with output of the content;

one or more activities of the user during output of the content;

one or more devices associated with output of the content; or one or more second content interrupted by output of the content.

3. The method of claim 1, wherein the individual frequency cap values and the combined frequency cap value are associated with one or more characteristics of the content, and wherein the content item comprises the one or more characteristics.

4. The method of claim 1, wherein the determining is further based on a percentage of the plurality of users assigned to the group corresponding to each of the individual frequency cap values.

5. The method of claim 1, further comprising:

receiving one or more modified individual frequency cap values for one or more of the plurality of users; and modifying, based on the one or more modified individual frequency cap values, the combined frequency cap value.

6. The method of claim 1, wherein the content and the content item comprise advertisements.

7. The method of claim 1, further comprising:

receiving, one or more modified individual frequency cap values for one or more of the plurality of users, wherein the one or more modified individual frequency cap values are based on a view through rate (VTR) associated with the content item.

8. The method of claim 1, wherein the group comprises the plurality of users having individual frequency cap values within a predefined range of values.

9. The method of claim 1, wherein the individual frequency cap values and the combined frequency cap value are associated with a genre of the content, and wherein the content item comprises the genre.

10. The method of claim 1, wherein the content item comprises a repeat content item that is repeatedly output via the one or more output computing devices associated with the one or more of the plurality of users.

11. The method of claim 1, wherein the causing the selection is further based on a determination that a quantity of outputs of the content item via the one or more output computing devices is within the combined frequency cap value.

12. The method of claim 1, wherein each of the individual frequency cap values are based on one or more interactions of the respective user, wherein the one or more interactions are associated with one or more outputs of a second content item, via one or more computing devices associated with the respective user.

13. A method comprising:

receiving, by a server associated with a content network and for each user of a plurality of users associated with the content network, information from one or more output computing devices associated with the plurality of users, indicating one or more interactions associated with output of repeat content;

determining, based on the information received for each of the plurality of users, individual frequency cap values for the plurality of users, wherein each of the individual frequency cap values indicates, for a corresponding user of the plurality of users, a quantity of allowable repeat content item outputs;

storing, in a configuration database of the server, the individual frequency cap values;

determining, based on the determined individual frequency cap values for the plurality of users and a quantity of the plurality of users, a combined frequency cap value for all of the plurality of users;

receiving, by a user of the plurality of users, from the one or more output computing devices, a request to output content, wherein the request comprises information that identifies the one or more output computing devices; and causing, based on the combined frequency cap value for all of the plurality of users, and based on the information that identifies the one or more output computing devices, selection of a content item that is sent to the one or more output computing devices for outputting the content.

14. The method of claim 13, wherein the individual frequency cap values comprise a quantity of different values, and wherein the determining the combined frequency cap value is further based on a percentage of the plurality of users corresponding to each of the different values.

15. The method of claim 13, wherein the repeat content item comprises a repeat advertisement, and wherein the content item comprises an advertisement.

16. The method of claim 13, wherein the information indicates, for each user of the plurality of users, a view through rate (VTR) for a plurality of outputs of a repeat content item.

17. The method of claim 13, wherein the repeat content item is associated with a characteristic, and wherein the causing the selection of the content item is further based on the content item being associated with a different characteristic.

18. A method comprising:

receiving, by a server associated with a content network, a frequency cap value associated with a user, the frequency cap indicating a quantity of allowable content outputs, wherein the frequency cap is based on interaction information received from one or more output computing devices associated with the user;

sending, based on the received frequency cap value and to an output computing device associated with the user, one or more messages indicating a content item and comprising an instruction to track one or more interactions associated with output of the content item;

receiving a combined frequency cap value for the user, wherein the combined frequency cap value is based on the tracked one or more interactions and a plurality of individual frequency cap values associated with a plurality of other users;

storing, in a configuration database of the server, the combined frequency cap value;

receiving, by the server, from the one or more output computing devices, a request to output another content item, wherein the request comprises information that identifies the one or more output computing devices; and selecting, based on the combined frequency cap value, and based on the information that identifies the one or more output computing devices, the another content item that is sent to one or more of the one or more output computing devices to output the another content item.

19. The method of claim 18, wherein the content item is associated with a characteristic, and wherein the selecting is further based on the content item being associated with a different characteristic.

20. The method of claim 18, wherein the instruction to track the one or more interactions associated with the output of the content item comprises an instruction to track a percentage of the content item output via the output computing device associated with the user.

21. The method of claim 18, wherein the instruction to track the one or more interactions associated with the output of the content item comprises an instruction to track a view through rate (VTR).

22. The method of claim 1, wherein the server of the content network comprises one or more of:

a push server;

a content server;

an application server; or an advertisement server.

* * * * *